United States Patent
Lin

(10) Patent No.: US 10,845,849 B2
(45) Date of Patent: Nov. 24, 2020

(54) PARALLEL BIAXIAL HINGE AND ELECTRONIC DEVICE

(71) Applicant: KEM HONGKONG LIMITED, Tsimshatsui Kowloon (HK)

(72) Inventor: Huawei Lin, Taipei (TW)

(73) Assignee: KEM HONGKONG LIMITED, Tsimshatsui Kowloon (HK)

( * ) Notice: Subject to any disclaimer, the term of this patent is extended or adjusted under 35 U.S.C. 154(b) by 0 days.

(21) Appl. No.: 16/044,162

(22) Filed: Jul. 24, 2018

(65) Prior Publication Data
US 2019/0056768 A1 Feb. 21, 2019

(30) Foreign Application Priority Data

Aug. 17, 2017 (JP) .................. 2017-157703

(51) Int. Cl.
*G06F 1/16* (2006.01)
*E05D 3/12* (2006.01)
*E05D 11/08* (2006.01)
*E05D 7/00* (2006.01)

(52) U.S. Cl.
CPC ............ *G06F 1/1681* (2013.01); *E05D 3/12* (2013.01); *E05D 7/00* (2013.01); *E05D 11/087* (2013.01); *G06F 1/1618* (2013.01); *E05Y 2900/606* (2013.01); *Y10T 16/547* (2015.01)

(58) Field of Classification Search
CPC ....... G06F 1/1681; G06F 1/1618; E05D 3/12; E05D 7/00; E05D 11/087; E05Y 2900/606; Y10T 16/547; Y10T 16/5387; Y10T 16/540255; H04M 1/0216; F16C 11/04

USPC ...................... 16/366, 303, 330; 379/433.13; 455/575.3; 361/679.27
See application file for complete search history.

(56) References Cited

U.S. PATENT DOCUMENTS

| | | | |
|---|---|---|---|
| 8,966,715 B1 * | 3/2015 | Chen ..................... | H04M 1/022 16/303 |
| 9,103,147 B1 * | 8/2015 | Chuang ................. | G06F 1/1681 |
| 9,464,471 B1 * | 10/2016 | Chen ..................... | G06F 1/1681 |
| 10,401,914 B2 * | 9/2019 | Shang ................... | G06F 1/1681 |
| 2016/0034004 A1 * | 2/2016 | Park ...................... | G06F 1/1681 16/330 |

(Continued)

FOREIGN PATENT DOCUMENTS

JP 2016080031 A 5/2016

*Primary Examiner* — William L Miller
(74) *Attorney, Agent, or Firm* — Notaro, Michalos & Zaccaria P.C.

(57) ABSTRACT

For a parallel biaxial hinge capable of downsizing and retrieving linear movement of large amplitude and important force, the hinge has an axial direction drive portion for retrieving a predetermined operating output accompanied by rotation of a hinge portion for rotating a first and second hinge shafts relative to each other. The axial direction drive portion has a follower part on the hinge portion for rotating relative to the first hinge shaft accompanied by rotating movement of the hinge portion, and a cam part having a cam groove on an outer circumferential surface engaged with the follower part and provided by outer-fitting onto the first hinge shaft so as to be movable relative to first attaching plate. The cam part moves in a rotation axis line direction of the first hinge shaft with the engaged portion guided by the follower part.

7 Claims, 17 Drawing Sheets

(56) References Cited

U.S. PATENT DOCUMENTS

| | | | |
|---|---|---|---|
| 2016/0102487 A1* | 4/2016 | Kuramochi | E05D 3/12 |
| | | | 361/679.27 |
| 2016/0138310 A1* | 5/2016 | Chuang | E05D 11/1078 |
| | | | 16/319 |
| 2017/0138102 A1* | 5/2017 | Chuang | E05D 3/06 |
| 2017/0275935 A1* | 9/2017 | Shang | F16C 11/103 |
| 2017/0351303 A1* | 12/2017 | Kuramochi | G06F 1/1618 |
| 2018/0059740 A1* | 3/2018 | Kato | E05D 3/06 |

\* cited by examiner

FIG. 2A
(0 degree)
FIG. 2B
(80 degrees)
FIG. 2C
(254 degrees)
FIG. 2D
(270 degrees)
FIG. 2E
(360 degrees)
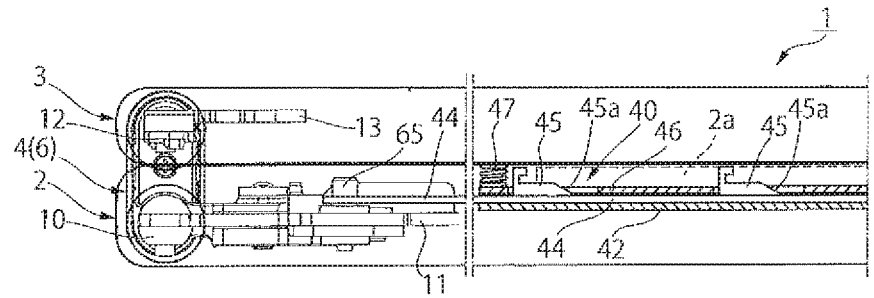
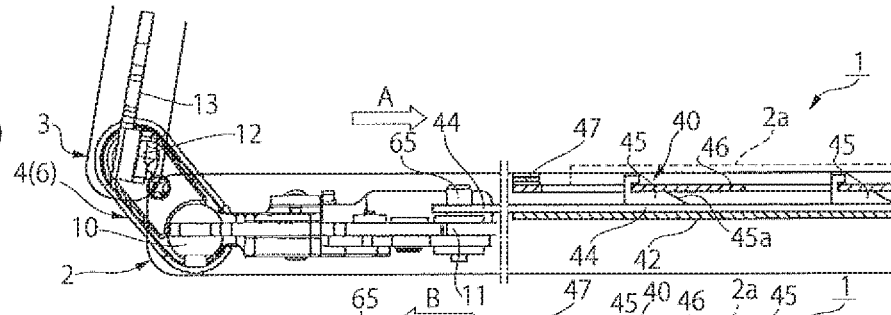
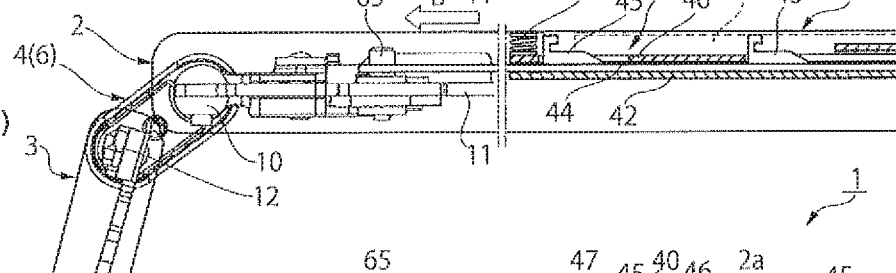
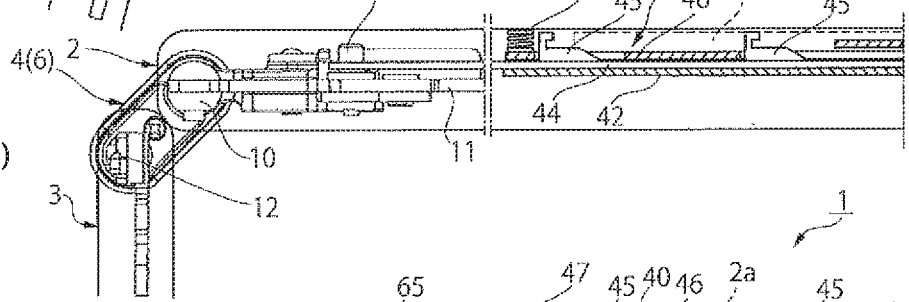
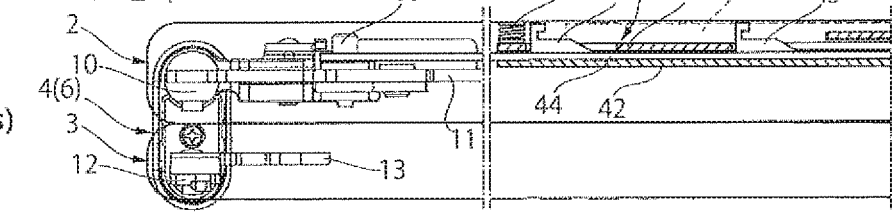

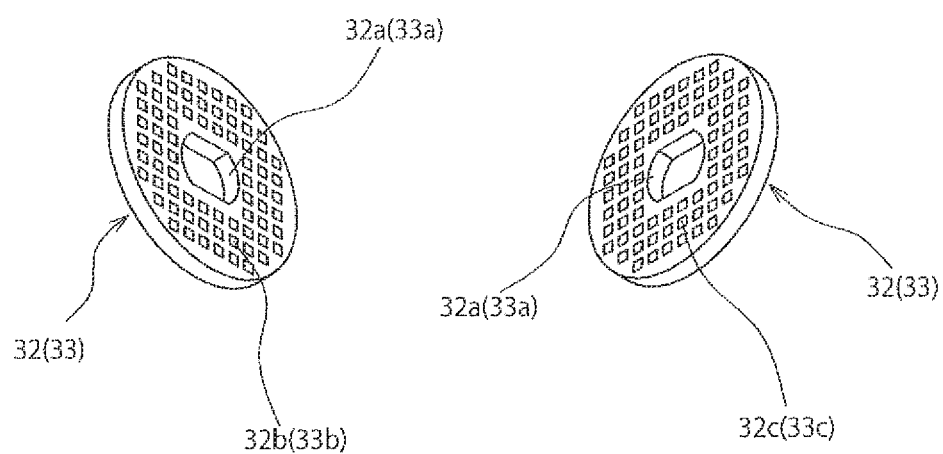

FIG. 13A
FIG. 13B
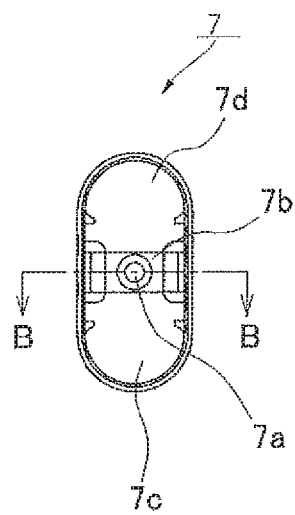
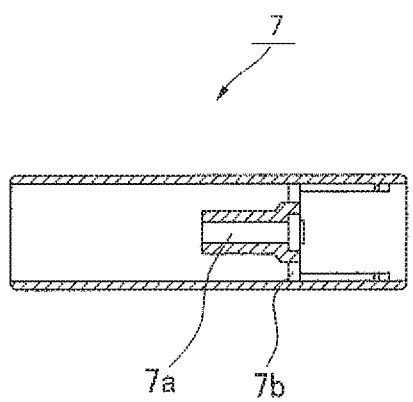

0 degree 80 degrees 254 degrees 270 degrees 360 degrees

PARALLEL BIAXIAL HINGE AND ELECTRONIC DEVICE

FIELD OF THE INVENTION

The invention relates to a parallel biaxial hinge for openably and closably coupling a first casing on a keyboard side to a second casing on a display side of e.g. electronic device, e.g. a notebook PC, and in particular to a parallel biaxial hinge configured to enable mechanisms other than the first casing and the second casing to operate while both are opened and closed relative to each other; the invention also relates to electronic device using such a parallel biaxial hinge.

BACKGROUND ART

A notebook PC as a sort of electronic device, wherein a first casing equipped with a keyboard is coupled to a second casing equipped with a liquid crystal display using a parallel biaxial hinge, so that the second casing can rotate in a range from 0 degree to 360 degrees relative to the first casing, has been already put into use.

In such a notebook PC, when the first casing and the second casing are opened relative to each other in use, a keyboard itself needs to be configured to rise up so as to facilitate operations on it, and when each of the first casing and the second casing is opened 180 degrees relative to each other, so that both casings are opened 360 degrees in total for touch operation on a display screen of the second casing with a keyboard side of the first casing facing down, the keyboard needs to sink so as to avoid malfunctions.

JP Laid-Open Patent Application No. 2016-80031 shows a mechanism for elevating and lowering a keyboard relative to a main body portion, depending on an opening angle of an opening and closing lid portion from 0 degree to 360 degrees. Here, a first hinge shaft and a second hinge shaft of a parallel biaxial hinge are rotatably supported by a hinge portion, so that both hinge shaft symmetrically rotate. Then, a cam for passing through the first hinge shaft so as to integrally rotate with the hinge portion is provided, and a slidably movable cam follower is provided on a base member fixed on the first hinge shaft. In this manner, a linear movement along the base member is retrieved on a cam follower on the base member, wherein the linear movement is accompanied by a rotation of the first hinge shaft and the second hinge shaft.

It is difficult to downsize the parallel biaxial hinge according to JP Laid-Open Patent Application No. 2016-80031, since many parts are needed for a mechanism for retrieving the linear movement as accompanied by a rotation of the first hinge shaft and the second hinge shaft. If the cam is downsized, an amplitude of the linear movement which can be retrieved from the cam follower is smaller, the strength of the parts is reduced and a force of the linear movement which can be retrieved is smaller as well.

SUMMARY OF THE INVENTION

An object of the invention is to provide a parallel biaxial hinge capable of downsizing and retrieving a linear movement of a relatively large stroke and a relatively important force, as accompanied by a rotation of a first hinge shaft and a second hinge shaft.

A parallel biaxial hinge according to the invention comprises a hinge portion for rotating a first hinge shaft attached to a first casing and a second hinge shaft attached to a second casing relative to each other via a synchronous rotating mechanism, and a passive operating portion for retrieving a predetermined operating output as accompanied by a rotating movement of the hinge portion; and the passive operating portion comprises a base member provided so as to integrally rotate with the first hinge shaft, an engaging member rotating relative to the first hinge shaft as accompanied by the rotating movement of the hinge portion, and an outer-fitted movable member having an engaged portion engaged with the engaging member on an outer circumferential surface, and provided by outer-fitting onto the first hinge shaft so as to be movable relative to a base member in a rotation axis line direction of the first hinge shaft. Furthermore, the outer-fitted movable member is configured to move in the rotation axis line direction, with the engaged portion being guided by the engaging member, as accompanied by the rotating movement of the hinge portion.

According to the invention, it is possible to provide a parallel biaxial hinge capable of downsizing and retrieving a linear movement of a relatively large stroke and a relatively important force, as accompanied by a rotation of a first hinge shaft and a second hinge shaft.

BRIEF DESCRIPTION OF THE DRAWINGS

FIG. 1A shows a state of a second casing as opened relative to a first casing, and FIG. 1B—a state of the second casing as closed relative to the first casing;

FIGS. 2A to 2E show explanatory views of an opening angle position of a second casing relative to a first casing; where FIG. 2A shows 0 degree, FIG. 2B—80 degrees, FIG. 2C—254 degrees, FIG. 2D—270 degrees and FIG. 2E—360 degrees;

FIG. 5A shows its plan view, FIG. 5B—its elevation view, and FIG. 5C—its side view;

FIG. 6A shows its plan view, FIG. 6B—its elevation view, and FIG. 6C—its side view;

FIG. 8A shows its left side view, FIG. 8B—a left side view of a gear supporting member, and FIG. 8C—a right side view of a gear supporting member;

FIG. 9A shows its surface facing a synchronous rotation portion side, and FIG. 9B—that facing a first urging portion side;

FIG. 10A shows its perspective view, FIG. 10B—its surface facing a first urging portion side, and FIG. 10C—that facing a synchronous rotation portion side;

FIGS. 11A and 11B show explanatory views of a structure of a first friction washer and a second friction washer; where FIG. 11A shows its surface facing a first urging portion side, and FIG. 11B—the one facing a synchronous rotation portion side;

FIGS. 13A and 13B shows an explanatory view of a structure of a hinge case, where FIG. 13A shows its side view, and FIG. 13B—its longitudinal cross section;

FIG. 16A shows 0 degree, FIG. 16B—80 degrees, and FIG. 16C—254 degrees; FIG. 17A shows 270 degree, and FIG. 17B—360 degrees.

EMBODIMENTS

Embodiments of the invention will be described in detail based on attached drawings.

Embodiment 1

(Notebook PC)

Figure 1A:
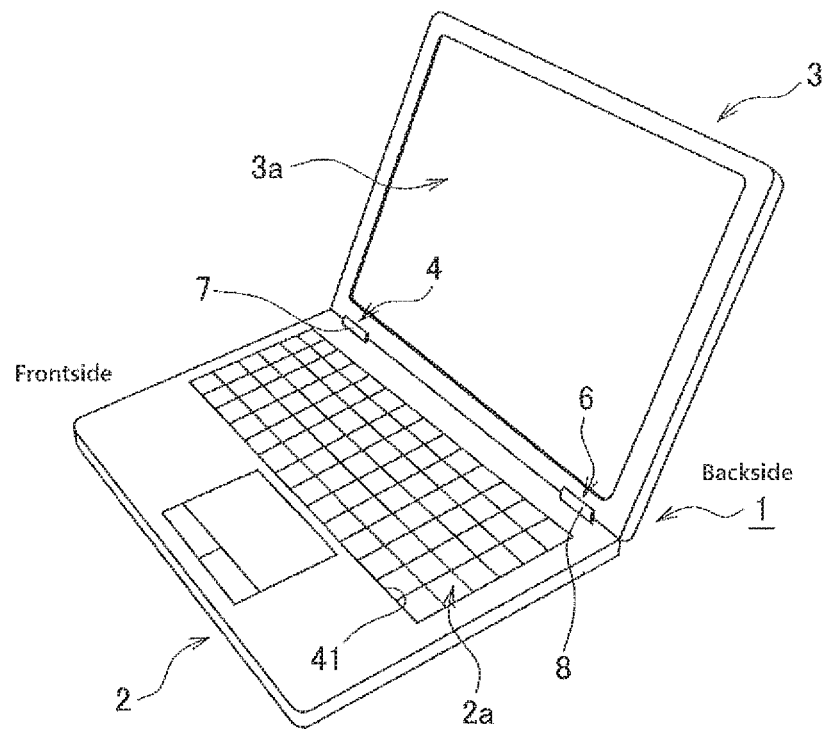
FIGS. 1A and 1B show explanatory views of a notebook PC according to Embodiment 1; where
Figure 1B:
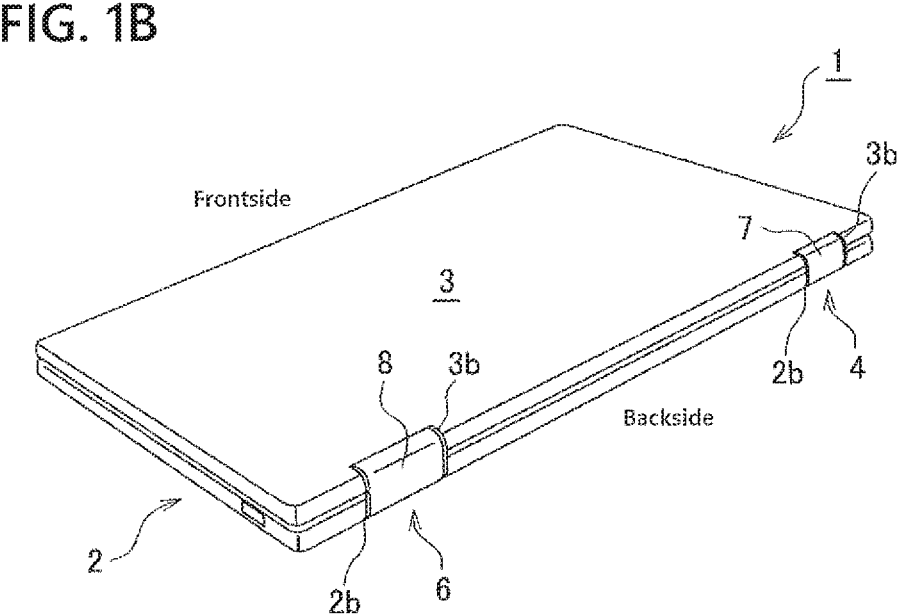

FIGS. 1A and 1B show an explanatory view of a notebook PC according to Embodiment 1. FIGS. 2A to 2E show explanatory views of an opening angle position of a second casing relative to a first casing. In FIGS. 1A and 2B, FIG. 1A shows a state of a second casing as opened relative to a first casing, and FIG. 1B—a state of the second casing as closed relative to the first casing. In FIGS. 2A to 2E, FIG. 2A shows 0 degree, FIG. 2B—80 degrees, FIG. 2C—254 degrees, FIG. 2D—270 degrees and FIG. 2E—360 degrees.

As shown in FIG. 1A, in a notebook PC 1, a second casing 3 is coupled to a first casing 2 via parallel biaxial hinges 4, 6 provided right and left on the first casing 2 such that both are rotatable relative to each other. A notebook PC 1 may have substantially an L shape, a chevron shape or a tablet shape with one casing overlapping the other, by opening and closing the first casing 2 relative to the second casing 3 in a synchronous manner, one in a direction opposite to another.

As shown in FIG. 1B, in a notebook PC 1, a second casing 3 provided with a display portion 3a can be freely opened and closed within a range of 0 to 360 degrees relative to a first casing 2 provided with a keyboard portion 2a via parallel biaxial hinges 4, 6. The display portion 3a has functions of displaying a calculated image, as well as of making it possible to operate the screen by touch input using fingers. To this end, a notebook PC 1 can be operated like a so-called tablet PC, with the second casing 3 being opened 360 degrees and overlapping a bottom surface of the first casing 2 as well as with the screen of the display portion 3a facing an operator.

As shown in FIG. 2A, each of first hinge shafts 10 of parallel biaxial hinges 4, 6 is fixed to a first casing 2 being an example of a first casing. Each of second hinge shafts 12 is fixed to a second casing 3 being an example of a second casing, so as to be rotatable integrally with the first casing 2. Each of the second hinge shafts 12 is disposed above each of the first hinge shafts 10 and in parallel to it, so as to be rotatable integrally with the second casing 3. A keyboard portion 2a being an example of input operating portion is provided in a keyboard holding plate 46 urged by an elastic member 47 in a descending direction.

(Sinking Mechanism)

As shown in FIG. 2A, in a notebook PC 1, when a second casing 3 is closed to 0 degree and a display portion 3a overlapping a keyboard portion 2a, the keyboard portion 2a is urged by an elastic member 47 to sink to a position lower than a surface of a first casing 2. This is to ensure a tight fitting between the first casing 2 and the second casing 3 to prevent foreign matters and water from entering into the first casing 2 from a gap between both casings.

As shown in FIG. 2B, in a notebook PC 1, when a second casing 3 is opened 80 to 120 degrees and erected from a first casing 2, a keyboard portion 2a is elevated so as to protrude from a surface of the first casing 2. This is to ensure an operability of the keyboard portion 2a by fingers.

As shown in FIG. 2E, in a notebook PC 1, when a second casing 3 is opened 360 degrees to abut against a bottom surface of a first casing 2, a keyboard portion 2a sinks to a position lower than the surface of the first casing 2 against urging force of an elastic member 47. This is to prevent from pressing keys on the keyboard portion 2a by mistake, when the notebook PC is put on a desk, with a screen on a display portion 3a facing upward.

A sinking mechanism works together with a rotation movement of a second casing 3 relative to a first casing 2 to elevate or lower a keyboard portion 2a as described above. The keyboard portion 2a is fixed to a keyboard holding plate 46. As described below, an output member 65 is to output a linear movement as retrieved from parallel biaxial hinges 4, 6 to the outside. The output member 65 linearly moves along a first attaching plate 11, as accompanied by a rotation of a second hinge shaft 12 relative to a first hinge shaft 10.

Since an output member 65 is restrained by one end portion of a slide member 44, as accompanied by a movement of the output member 65, the slide member 44 linearly moves as well along a first attaching plate 11. Furthermore, on an upper surface of the slide member 44, a cam member 45 is fixed. In this manner, as accompanied by a movement of the slide member 44 along the first attaching plate 11, an inclined surface 45a of the cam member 45 elevates or lowers a keyboard holding plate 46.

As shown in FIG. 2B, while a second casing 3 transits from an opening angle of 0 to 80 degrees relative to a first casing 2 an output member 65 and a slide member 44 move in a direction of arrow A, so that a cam member 45 elevates a keyboard portion 2a and a keyboard holding plate 46, against an urging of an elastic member 47. Thereafter, as shown in FIG. 2C, while a second casing 3 transits from an opening angle of 80 to 254 degrees relative to a first casing 2 an output member 65 and a slide member 44 move in a direction of arrow B, so that the cam member 45 releases the keyboard portion 2a and the keyboard holding plate 46 from a pressure upward. In this manner, the keyboard portion 2a and the keyboard holding plate 46 as urged by the elastic member 47 are lowered.

In the meantime, a sinking mechanism 40 is merely an example of mechanism for elevating and lowering a keyboard holding plate 46. A mechanism for elevating and lowering the keyboard holding plate 46 as accompanied by a linear movement of an output member 65 may be any other mechanism without use of a cam member 45, e.g. a link mechanism.

In the following, reference is made in detail to a mechanism of a parallel biaxial hinge 4 and to a mechanism for retrieving a linear movement from the parallel biaxial hinge 4 to an output member 65. As shown in FIGS. 1A and 1B, the parallel biaxial hinge 4 and a parallel biaxial hinge 6 have an identical structure, except that both are bilaterally symmetrical. Therefore, reference is exclusively made to the parallel biaxial hinge 4, not to give redundant descriptions of the parallel biaxial hinge 6.

(Parallel biaxial hinge)

Figure 3:
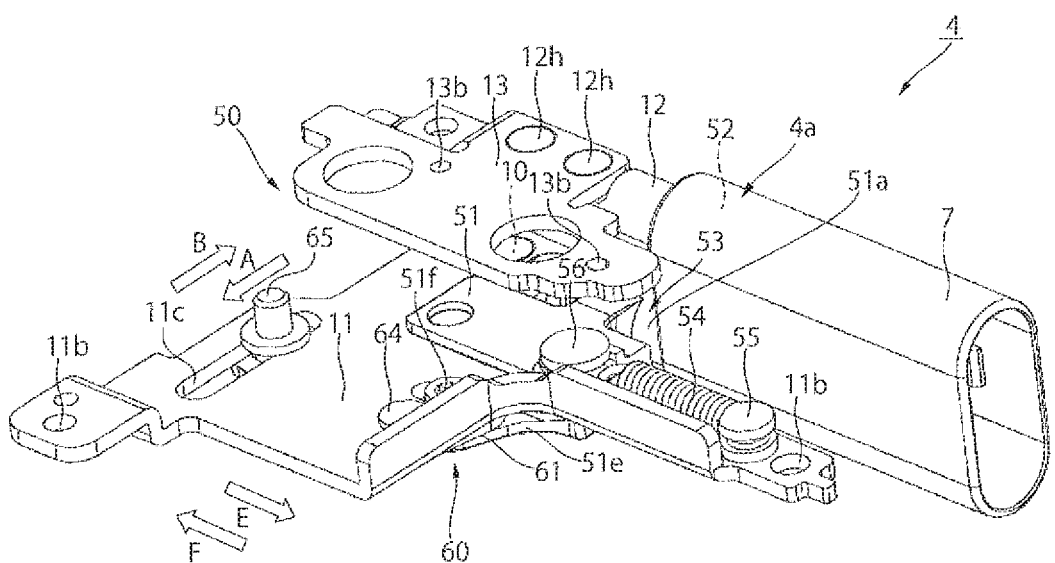
FIG. 3 shows a perspective view of a parallel biaxial hinge according to Embodiment 1.
Figure 4:
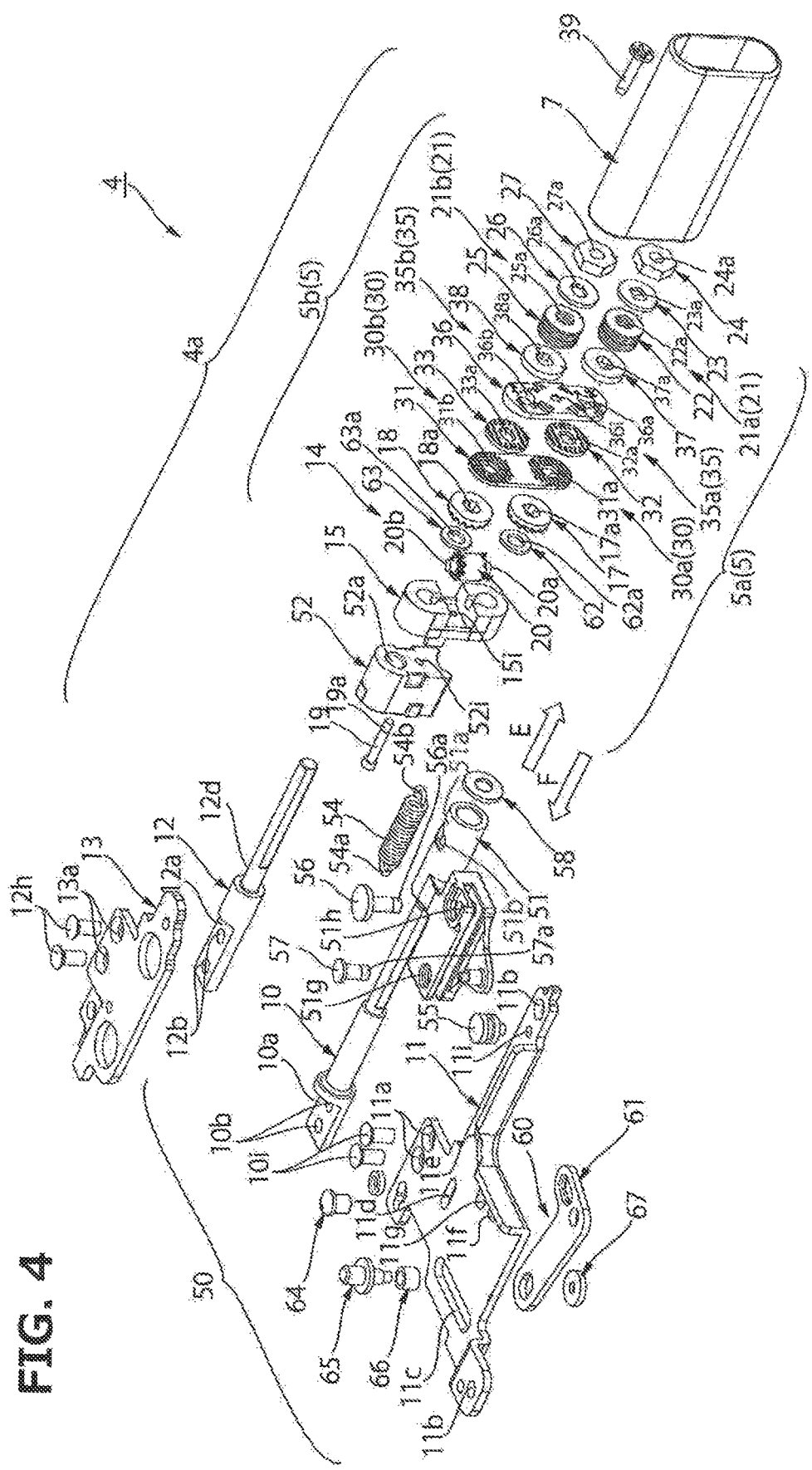
FIG. 4 shows an exploded perspective view of a parallel biaxial hinge according to Embodiment 1.
Figure 5A:
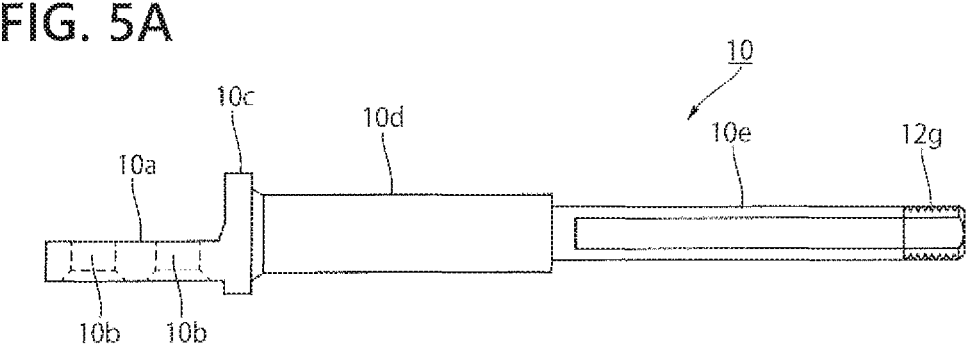
FIGS. 5A to 5C show explanatory views of a first hinge shaft; where
Figure 5B:
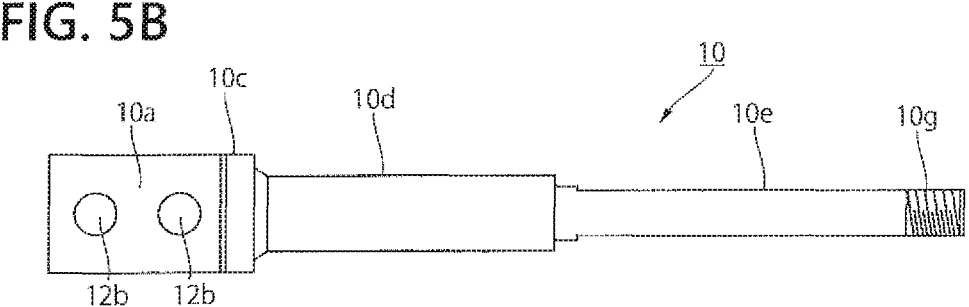
Figure 5C:
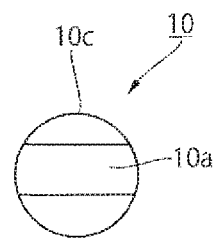
Figure 6A:
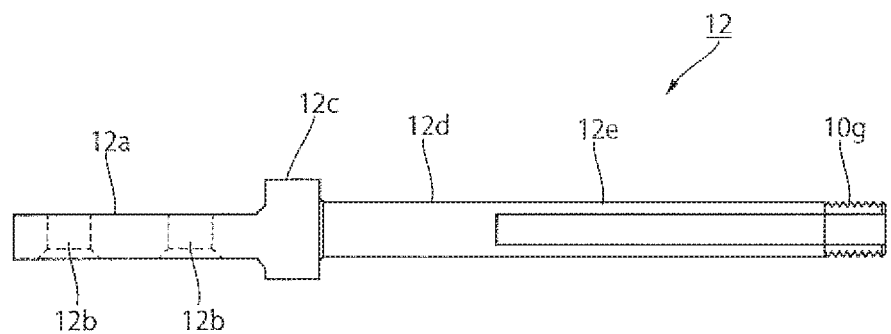
FIGS. 6A to 6C show explanatory views of a second hinge shaft; where
Figure 6B:
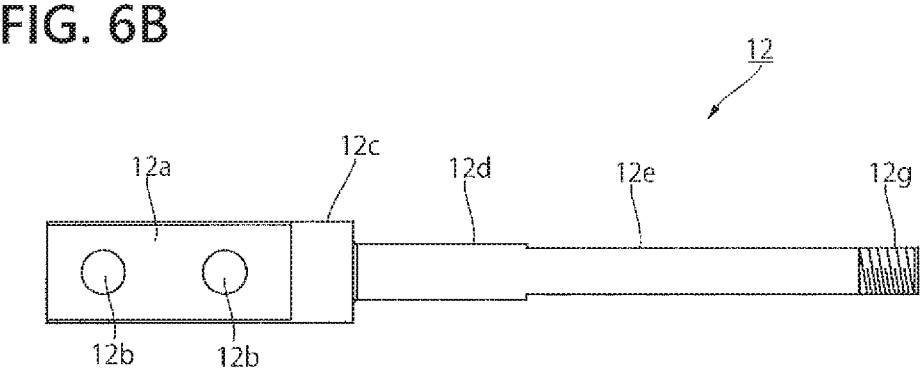
Figure 6C:
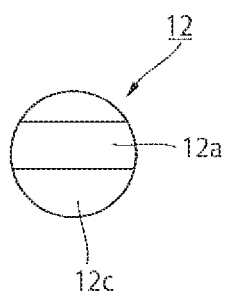

FIG. 3 shows a perspective view of a parallel biaxial hinge according to Embodiment 1. FIG. 4 shows an exploded perspective view of a parallel biaxial hinge according to Embodiment 1. FIGS. 5A to 5C show explanatory views of a first hinge shaft. In FIG. 5A to 5C, FIG. 5A shows its plan view, FIG. 5B—its elevation view, and FIG. 5C—its side view. FIGS. 6A to 6C show explanatory views of a second hinge shaft. In FIGS. 6A to 6C, FIG. 6A shows its plan view, FIG. 6B—its elevation view, and FIG. 6C—its side view.

As shown in FIG. 3, a parallel biaxial hinge 4 comprises a hinge portion 4a. The hinge portion 4a being an example of hinge portion holds a first hinge shaft 10 and a second hinge shaft 12 in parallel and rotatably supports them. The hinge portion 4a being an example of interlocking mechanism interlocks the first hinge shaft 10 and the second hinge shaft 12, such that the first hinge shaft 10 and the second hinge shaft 12 rotate symmetrically.

As shown in FIG. 4, a first attaching plate 11 can be fixed to a first casing 2 and is fixed to a first hinge shaft 10. On the first hinge shaft 10, attaching holes 10b, 10b are provided on an attaching plate portion 10a having a flat cross section. A first attaching plate 11 is attached to the attaching plate portion 10a using attaching pins 10i, 10i. The first attaching plate 11 being an example of base member is fixed to an end portion of the first hinge shaft 10. The first attaching plate 11 is attached to a frame of a first casing 2 shown in FIG. 2A using attaching screws (not shown) attached to a plurality of attaching holes 11b, 11b . . . provided on the first attaching plate 11.

A first attaching plate 11 is attached to an attaching plate portion 10a by caulking respective end portions of flanged attaching pins 10i, 10i, as these pins have passed through attaching holes 10b, 10b of the first hinge shaft 10 and attaching holes 11a, 11a of the first attaching plate 11. In the meantime, the attaching pins 10i, 10i can be attaching screws with nuts.

On the other hand, a second attaching plate 13 can be fixed to a second casing 3, and is fixed to the second hinge shaft 12. On the second hinge shaft 12, attaching holes 12b, 12b are provided on an attaching plate portion 12a having a flat cross section. A second attaching plate 13 is attached to the attaching plate portion 12a using attaching pins 12h, 12h. The second attaching plate 13 is attached to a frame of a second casing 2 shown in FIG. 2A using attaching screws (not shown) attached to a plurality of attaching holes 13b, 13b . . . provided on the second attaching plate 13.

The second attaching plate 13 is attached to the attaching plate portion 12a by caulking respective end portions of flanged attaching pins 12h, 12h, as these pins have passed through attaching holes 12b, 12b of the second hinge shaft 12 and attaching holes 11a, 11a of the second attaching plate 13. In the meantime, the attaching pins 12h, 12h can be attaching screws with nuts.

As shown in FIG. 4, a first hinge shaft 10 and a second hinge shaft 12 are rotatably supported at a plurality of positions in a rotation axis line direction on a rotation controlling portion 5 housed in a hinge case 7, so that both hinge shafts are held in parallel to each other. The rotation controlling portion 5 holds the first hinge shaft 10 and the second hinge shaft 12 in parallel to each other, by a gear supporting member 15, a friction plate 31 and a cam plate member 36, all being fixed at a positional relation among them by the hinge case 7. The rotation controlling portion 5 rotatably holds the first hinge shaft 10 and the second hinge shaft 12 by rotatably inserting the first hinge shaft 10 and the second hinge shaft 12 through a first A bearing hole 15c and a first B bearing hole 15d provided on a gear supporting member 15, and through a second A bearing hole 31a and a second B bearing hole 31b provided on a friction plate 31, as well as through a third A bearing hole 36a and a third B bearing hole 36b provided on a cam plate member 36.

As shown in FIGS. 5A and 5B, a first circular shaft portion 10d is provided next to a flange portion 10c provided next to an attaching plate portion 10a on the first hinge shaft 10. Further, a second circular shaft portion 10e having a smaller diameter than the first circular shaft portion 10d is provided next to the first circular shaft portion 10d. On the tip side of the second circular shaft portion 10e, a first deformed shaft portion 10f processed so as to have a substantially elliptic cross section is formed, as well as a male screw portion 10h provided next to the first deformed shaft portion 10f.

As shown in FIGS. 6A and 6B, a circular shaft portion 12d is provided next to a flange portion 12c provided next to an attaching plate portion 12a on a first hinge shaft 12. On the tip side of the circular shaft portion 12d, a first deformed shaft portion 12e processed so as to have a substantially elliptic cross section is formed, as well as a male screw portion 12g provided next to the first deformed shaft portion 12e.

(Rotation Controlling Portion)

Figure 7:
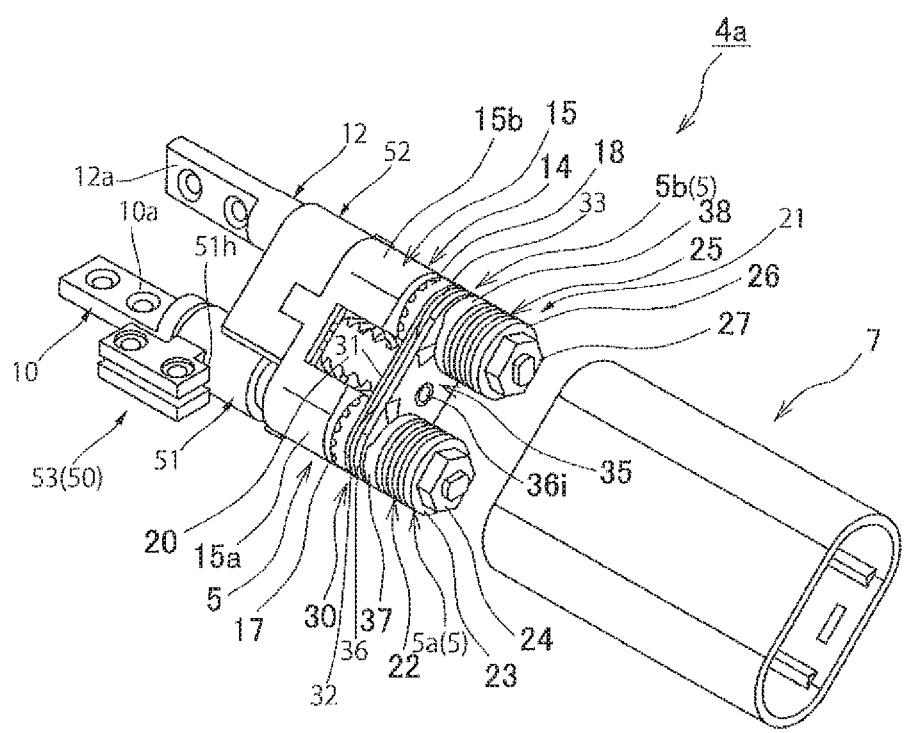
FIG. 7 shows an explanatory view of a rotation controlling portion.

FIG. 7 shows an explanatory view of an assembled state of a rotation controlling portion. As shown in FIG. 3, a first attaching plate 11 being an example of base member is fixed to an end portion of a first hinge shaft 10. A hinge portion 4a being an example of hinge portion is placed on an end portion opposite to the first attaching plate 11 of the first hinge shaft 10, and holds a first hinge shaft 10 and a second hinge shaft 12 in parallel and rotatably supports them.

As shown in FIG. 7, a rotation controlling portion 5 is provided so as to connect a first hinge shaft 10 and a second hinge shaft 12. A rotation controlling portion 5 consists of a first rotation controlling portion 5a for controlling a rotation of the first hinge shaft 10 and a second rotation controlling portion 5b for controlling a rotation of the second hinge shaft 12.

As shown in FIG. 4 in reference to FIG. 7, a first rotation controlling portion 5a is composed of a synchronous rotation portion 14, a first urging portion 21a, a first friction torque generating portion 30a and a first drawing portion 35a. Further, the first urging portion 21a applies a press contact force both on the first friction torque generating portion 30a and on the first drawing portion 35a, and exhibits a friction torque generating function and a drawing function on the first hinge shaft 10 while the first hinge shaft 10 rotates in an opening and closing operation of a first casing 2 and a second casing 3. Furthermore, the second rotation controlling portion 5b is composed of the synchronous rotation portion 14, a second urging portion 21b, a second friction torque generating portion 30b and a second drawing portion 35b. Further, the second urging portion 21b applies a press contact force both on the second friction torque generating portion 30b and on the second drawing portion 35a, and exhibits a friction torque generating function and a drawing function on the second hinge shaft 12 while the second hinge shaft 12 rotates in an opening and closing operation of the first casing 2 and the second casing 3.

Here, a friction torque generating function is a function of generating a friction resistance required to stop and hold a first casing 2 and a second casing 3 at any rotation position. Further, the drawing function is a function of drawing the first casing 2 and the second casing 3 at predetermined angular positions (0 and 360 degrees) and maintaining the angular positions.

A first urging portion 21a generates a pressure required for a first friction torque generating portion 30a and a first drawing portion 35a, by fastening a first fastening nut 24 to compress a first elastic member 22. The first elastic member 22 consists of a plurality of disc springs or spring washers provided by inserting a first deformed shaft portion 10f of a first hinge shaft 10 shown in FIGS. 5A to 5C through their circular insertion holes 22a and placing these disc springs or spring washers one above the other. A first backing washer 23 is disposed next to the first elastic member 22, and made up by inserting the first deformed shaft portion 10f of the first hinge shaft 10 shown in FIGS. 5A to 5C through a deformed insertion hole 23a on its middle portion and engaging the former with the latter. A first fastening nut 24 is disposed next to the first backing washer 23, and made up by screwing a male screw portion 10h of the first hinge shaft 10 shown in FIGS. 5A to 5C to its female screw hole 24a.

As shown in FIG. 4, a second urging portion 21b generates a pressure required for a second friction torque generating portion 30b and a second drawing portion 35b, by fastening a second fastening nut 27 to compress a second elastic member 25. The second elastic member 25 consists of a plurality of disc springs or spring washers provided by inserting a first deformed shaft portion 12e of a second hinge shaft 12 shown in FIGS. 6A to 6C through their circular insertion holes 25a and placing these disc springs or spring washers one above the other. A second backing washer 26 is disposed next to the second elastic member 25, and made up by inserting the first deformed shaft portion 12e of the second hinge shaft 12 shown in FIGS. 6A to 6C through a circular insertion hole 26a on its middle portion and engaging the former with the latter. A second fastening nut 27 is disposed next to the second backing washer 26, and made up by screwing a male screw portion 12g of the second hinge shaft 12 shown in FIGS. 6A to 6C to its male screw hole 27a.

(Synchronous Rotation Portion)

Figure 8A:
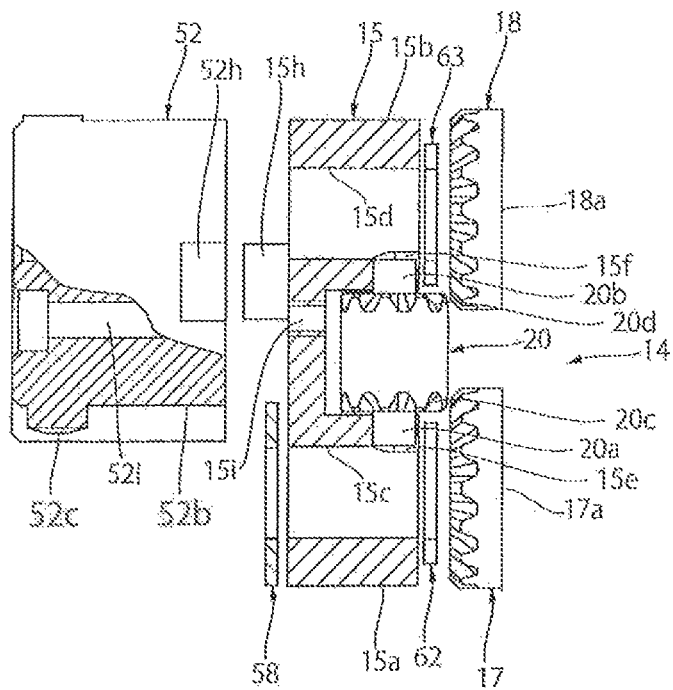
FIGS. 8A to 8C show explanatory views of a synchronous rotation portion; where
Figure 8B:
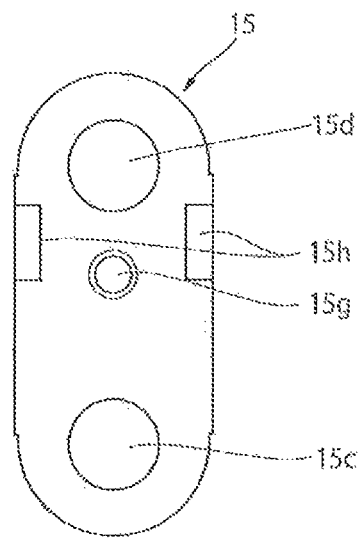
Figure 8C:
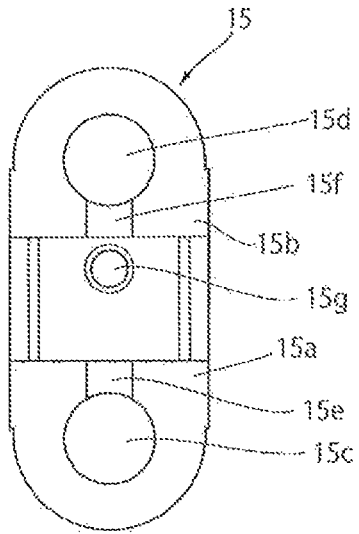

FIGS. 8A to 8C show explanatory views of a synchronous rotation portion. In FIGS. 8A to 8C, FIG. 8A shows a synchronous rotation portion, and FIG. 8B—a gear supporting member. A synchronous rotation portion 14 being an example of synchronous rotation mechanism rotates a first hinge shaft 10 and a second hinge shaft 12 in a synchronized manner, such that the first hinge shaft 10 and the second hinge shaft 12 rotate symmetrically relative to a rotation controlling portion 5. The synchronous rotation portion 14 rotates the first hinge shaft 10 and the second hinge shaft 12 in a synchronized manner and symmetrically to the rotation controlling portion 5, by means of an intermediate gear 20.

As shown in FIGS. 8A to 8C, a gear supporting member 15 comprises a first A bearing hole 15c on a lower projecting portion 15a and a first B bearing hole 15d on an upper projecting portion 15b. The first A bearing hole 15c rotatably inserts a second deformed shaft portion 10e of a first hinge shaft 10 shown in FIGS. 5A to 5C therein. The first B bearing hole 15d rotatably inserts a circular shaft portion 12d of a second hinge shaft 12 shown in FIGS. 6A to 6C therein.

A lower support shaft 20a and an upper support shaft 20b of an intermediate gear 20 is rotatably inserted through and supported by a first shaft support groove 15e provided on a lower projecting portion 15a and a second shaft support groove 15f provided on an upper projecting portion 15b of a gear supporting member 15. The intermediate gear 20 comprises a lower bevel tooth portion 20c on its lower portion and an upper bevel tooth portion 20d on its upper portion.

A first gear 17 and a second gear 18 are identical parts. The first gear 17 consists of a bevel gear, with a first deformed shaft portion 10f of a first hinge shaft 10 shown in FIGS. 5A to 5C being inserted through and engaged with its deformed insertion hole 17a provided on its middle portion in an axial direction. The first gear 17 is meshed with a lower bevel tooth portion 20c of an intermediate gear 20. The second gear 18 consists of a bevel gear, with a first deformed shaft portion 12e of a second hinge shaft 12 shown in FIGS. 6A to 6C being inserted through and engaged with its deformed insertion hole 18a provided on its middle portion in an axial direction. The second gear 18 is meshed with an upper bevel tooth portion 20d of the intermediate gear 20.

Washers 62, 63 are made up of lubricating resin to mitigate a friction between a first gear 17, a second gear 18 and a gear supporting member 15.

(Friction Torque Generating Portion)

Figure 9A:
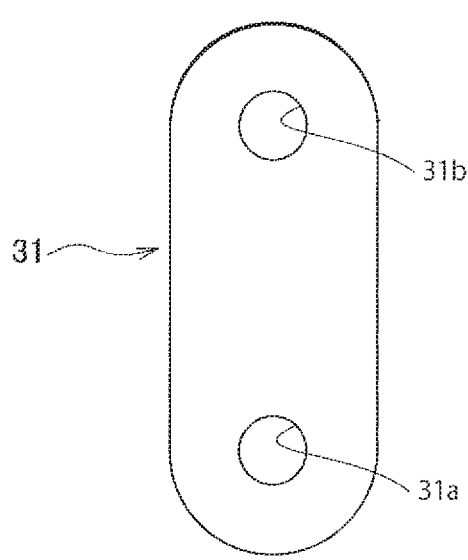
FIGS. 9A and 9B show explanatory views of a structure of a friction plate; where
Figure 9B:
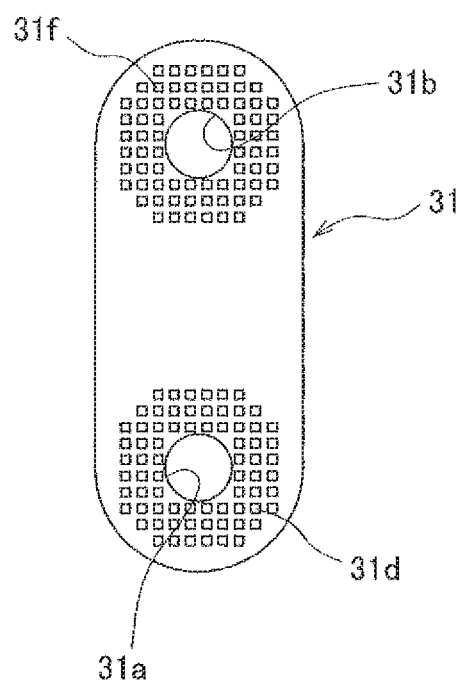
Figure 10A:
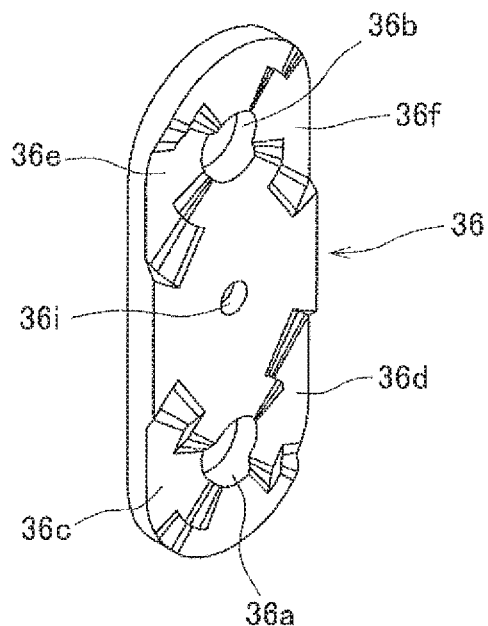
FIGS. 10A to 10C show explanatory views of a structure of a cam plate member; where
Figure 10B:
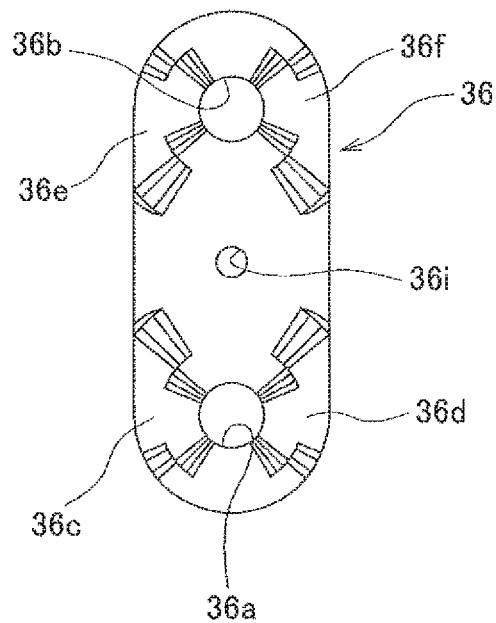
Figure 10C:
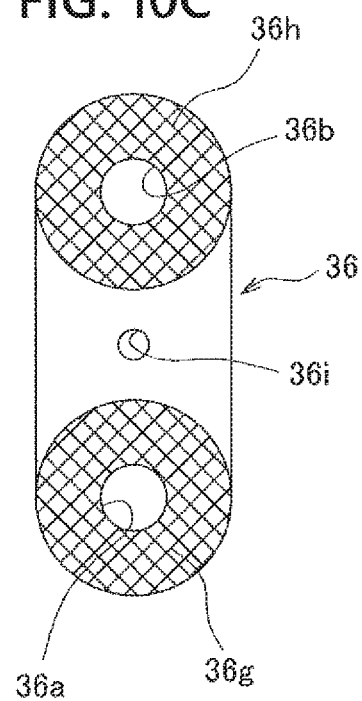

FIGS. 9A and 9B show explanatory views of a structure of a friction plate. FIGS. 10A to 10C show explanatory views of a structure of a cam plate member. FIG. 11 show explanatory views of a structure of a first friction washer and a second friction washer. In FIGS. 9A and 9B, FIG. 9A shows its surface facing a synchronous rotation portion side, and FIG. 9B—that facing a first urging portion side. In FIGS. 10A to 10C, FIG. 10A shows its perspective view, FIG. 10B—its surface facing a first urging portion side, and FIG. 10C—that facing a synchronous rotation portion side. In FIGS. 11A and 11B, FIG. 11A shows its surface facing a first urging portion side, and FIG. 11B—that facing a synchronous rotation portion side.

As shown in FIG. 7, a friction torque generating portion 30 acts together with a first hinge shaft 10 and a second hinge shaft 12 in their rotation to generate a friction torque to exert a stable stop effect at any angle in an opening and closing operation of a first casing 2 and a second casing 3 shown in FIGS. 2A to 2E. The friction torque generating portion 30 is disposed between a synchronous rotation portion 14 and a drawing portion 35, and as shown in FIG. 4, it consists of a first friction torque generating portion 30a below and a second friction torque generating portion 30b above.

A first friction torque generating portion 30a generates a friction torque between a friction plate 31, a first friction washer 32 and a cam plate member 36, on which pressure is applied by a first elastic member 22. The friction plate 31 rotatably inserts a first deformed shaft portion 10f of a first hinge shaft 10 shown in FIGS. 5A to 5C through a first bearing hole 31a on a lower portion side. As shown in FIG. 9B, a waffle-knurl pattern portion 31d being friction surface is formed on the side facing a first urging portion 21a on the friction plate 31 to enhance durability. Furthermore, the cam plate member 36 rotatably inserts a first deformed shaft portion 10f of a first hinge shaft 10 shown in FIGS. 5A to 5C through a third A bearing hole 36a on a lower portion side. As shown in FIG. 10C, a waffle-knurl pattern portion 36g being friction surface is formed on the surface facing a first urging portion 21a on the cam plate member 36 to enhance durability.

A first friction washer 32 is disposed as overlapping a surface facing a first urging portion 21a on the cam plate member 36. The first friction washer 32 is made up by inserting a first deformed shaft portion 10f of a first hinge shaft 10 shown in FIGS. 5A to 5C through a first deformed insertion hole 32a on its middle portion and engaging the former with the latter. As shown in FIGS. 11A and 11B, friction surfaces are formed on both surfaces 32b, 32c of the first friction washer 32. In this manner, as accompanied by a rotation of the first hinge shaft 10 under pressure by a first urging portion 21a, a friction is generated both between respective opposing surfaces of a friction plate 31 and a first friction washer 32 and between respective opposing surfaces of the first friction washer 32 and a cam plate member 36. In the meantime, as shown in FIG. 9A, a surface facing a synchronous rotation portion 14 on the friction plate 31 is made up of a resin material having a low friction coefficient to be flat, in order to reduce a friction between it and a first gear 17 to rotate relative to it.

A second friction torque generating portion 30b generates a friction torque between a friction plate 31, a first friction washer 32 and a cam plate member 36, on which pressure is applied by a first elastic member 22. The friction plate 31 rotatably inserts the first deformed shaft portion 12e of a second hinge shaft 12 shown in FIGS. 5A to 5C through a second B bearing hole 31b on an upper portion side. As shown in FIG. 9B, a waffle-knurl pattern portion 31f being friction surface is formed on the side facing a urging portion 21 on the friction plate 31 to enhance durability. Furthermore, a first deformed shaft portion 10e of a second hinge shaft 12 shown in FIGS. 6A to 6C is rotatably inserted through a third B bearing hole 36b on an upper portion side of the cam plate member 36. As shown in FIG. 10C, a waffle-knurl pattern portion 36h being relatively smooth corrugated surface is formed on the surface facing a first urging portion 21a on the cam plate member 36 to enhance durability.

A second friction washer 33 is disposed as overlapping the surface facing a urging portion 21 on the friction plate 31. A first deformed shaft portion 10e of a second hinge shaft 12 shown in FIGS. 6A to 6C is inserted through and engaged with a first deformed insertion hole 33a on its middle portion. As shown in FIGS. 11A to 11B, friction surfaces are formed on both surfaces 33b, 33c of the second friction washer 33. In this manner, as accompanied by a rotation of the second hinge shaft 12 under pressure by a second urging portion 21b, a friction is generated both between respective opposing surfaces of a friction plate 31 and a second friction washer 32 and between respective opposing surfaces of the second friction washer 32 and a cam plate member 36. In the meantime, as shown in FIG. 9A, a surface facing a synchronous rotation portion 14 on the friction plate 31 is made up of a resin material having a low friction coefficient to be flat, in order to reduce a friction between it and a second gear 18 to rotate relative to it.

(Drawing Portion)

Figure 12:
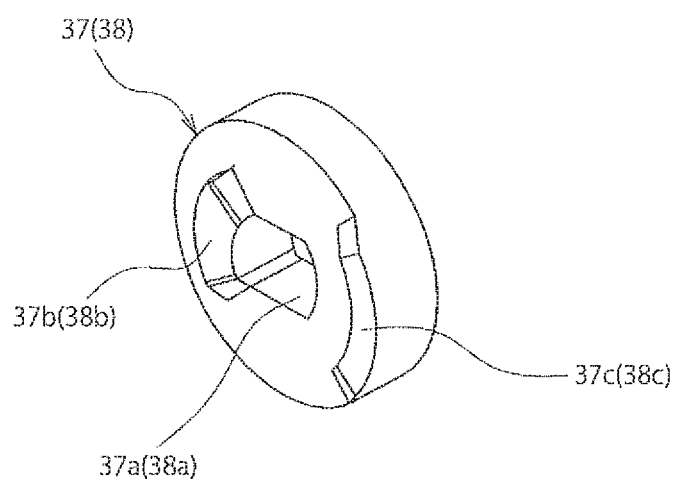
FIG. 12 shows an explanatory view of a structure of a first cam follower and a second cam follower.

FIG. 12 shows an explanatory view of a structure of a first cam follower and a second cam follower. As shown in FIG. 7, a drawing portion 35 is disposed between a friction torque generating portion 30 and an urging portion 21. In a closed state of a first casing 2 and a second casing 3 at their opening angle of 0 degree as shown in FIGS. 2A to 2E, a drawing portion 35 maintains the closed state without allowing the first casing 2 and the second casing 3 to automatically open, even with no latch mechanism being provided between the first casing 2 and the second casing 3. Furthermore, in an inversion state of a first casing 2 and a second casing 3 at their opening angle of 360 degrees, the drawing portion maintains the inversion state without allowing the second casing 3 to automatically float from the first casing 2 even with no latch mechanism being provided between the first casing 2 and the second casing 3.

As shown in FIG. 4 in reference to FIG. 7, a drawing portion 35 consists of a first drawing portion 35a on a first hinge shaft 10 side and a second drawing portion 35b on a second hinge shaft 12 side. The first drawing portion 35a is composed of a cam plate member 36 and a first cam follower 37 pressurized by a first urging portion 21a. A rotation of the first cam follower 37 is restrained by a first hinge shaft 10, but the first cam follower is slidable in a rotation axis line direction of the first hinge shaft 10.

A cam plate member 36 rotatably inserts a first deformed shaft portion 10f of a first hinge shaft 10 shown in FIGS. 5A to 5C through a third A bearing hole 36a on a lower portion side. A rotation of a first cam follower 37 is restrained by inserting the first deformed shaft portion 10f of the first hinge shaft 10 through its deformed insertion hole 37a and engaging the former with the latter. In this manner, as accompanied by a rotation of the first hinge shaft 10 under pressure by a first urging portion 21a, a relative rotation is generated between abutting surfaces of the cam plate member 36 and the first cam follower 37.

As shown in FIGS. 10A to 10C, a first A cam concave portion 36c substantially in an arc shape is formed on an outer circumferential surface side on a surface of a cam plate member 36 opposing to a first cam follower 37, and a first B cam concave portion 36d substantially in an arc shape is formed further to the inside from the first A cam concave portion 36c. As shown in FIG. 12, a first A cam convex portion 37c substantially in an arc shape is formed on an outer circumferential surface side on a surface of the first cam follower 37 opposing to the cam plate member 36, and a first B cam convex portion 37b substantially in an arc shape is formed further to the inside from the first A cam convex portion 37c.

In this manner, when a relative rotation is generated between a cam plate member 36 and a first cam follower 37, a pressure upward and a pressure downward are respectively generated between a first A cam concave portion 36c and a first B cam convex portion 37b, and between a first B cam concave portion 36d and a first B cam convex portion 37b, so that the total thickness of the cam plate member 36 and the first cam follower 37 changes as they overlap each other.

A second drawing portion 35b is composed of a cam plate member 36 and a second cam follower 38 pressurized by a second urging portion 21b. As shown in FIG. 4, a rotation of the second cam follower 38 is restrained by a second hinge shaft 12, but the second cam follower is slidable in a rotation axis line direction of the second hinge shaft 12.

A cam plate member 36 rotatably inserts a first deformed shaft portion 12e of a second hinge shaft 12 shown in FIGS. 6A to 6C through a third B bearing hole 36b on an upper portion side. A rotation of the second cam follower 38 is restrained by inserting the first deformed shaft portion 12e of the second hinge shaft 12 through its deformed insertion hole 38a and engaging the former with the latter. In this manner, as accompanied by a rotation of the second hinge shaft 12 under pressure by a second urging portion 21b, a relative rotation is generated between abutting surfaces of the cam plate member 36 and the second cam follower 38.

As shown in FIGS. 10A to 10C, a second A cam concave portion 36e substantially in an arc shape is formed on an outer circumferential surface side on a surface of a cam plate member 36 opposing to a second cam follower 38, and a second B cam concave portion 36f substantially an arc shape is formed further to the inside from the first A cam concave portion 36e. As shown in FIG. 12, a second A cam convex portion 38c substantially in an arc shape is formed on an outer circumferential surface side on a surface of the second cam follower 38 opposing to the cam plate member 36, and a second B cam convex portion 38b substantially in an arc shape is formed further to the inside from the second A cam convex portion 38c.

In this manner, when a relative rotation is generated between the cam plate member 36 and a second cam follower 38, a pressure upward and a pressure downward are respectively generated both between a second A cam concave portion 36e and a second A cam convex portion 38c, as well as between a second B cam concave portion 36f and a second B cam convex portion 37b, so that the total thickness of the cam plate member 36 and the first cam follower 37 changes as they overlap each other.

Here, at rotation positions corresponding to opening angles of 0 degree and 360 degrees of a first hinge shaft 10 and a second hinge shaft 12, both the thickness of a first cam follower 37 and a cam plate member 36 and that of a second cam follower 38 and the cam plate member 36 are the smallest, and a pressurizing force by the urging portion 21 is the smallest. Still further, at rotation positions corresponding to opening angles of 150 to 210 degrees of the first hinge shaft 10 and the second hinge shaft 12, both the thickness of the first cam follower 37 and the cam plate member 36 and that of the second cam follower 38 and the cam plate member 36 are the maximum, and a pressurizing force by the urging portion 21 is the maximum.

Thereafter, at rotation positions corresponding almost to opening angles of 0 degree and 360 degrees of a first hinge shaft 10 and a second hinge shaft 12, both inclined surfaces of a first A cam concave portion 36e and a first A cam convex portion 37c abut against each other, as well as both inclined surfaces of a first B cam concave portion 36f and a first B cam convex portion 37b, so that both the first A cam concave portion and the first B cam convex portion slide and fall toward the rotation position corresponding almost to the opening angles of 0 degree and 360 degrees. Then, the first casing 2 and the second casing 3 automatically move to the rotation positions corresponding to the opening angles of 0 degree and 360 degrees, so that they are stably held at the rotation positions corresponding to opening angles of 0 degree and 360 degrees.

(Hinge Case)

FIGS. 13A and 13B show explanatory views of a structure of a hinge case. As shown in FIG. 7, a hinge case 7 is attached to a hinge portion 4a. The hinge case 7 has a cylindrical shape with a cross section in the shape of elongated hole to house a synchronous rotation portion 14 of a rotation controlling portion 5, a friction torque generating portion 30, a drawing portion 35, an urging portion 21 and an axial direction drive portion 53 being a part of an actuating mechanism 50. As shown in FIG. 4, the hinge case 7 is attached to a female screw hole 36i provided on a cam plate member 36 using an attaching screw 39.

As shown in FIGS. 13A and 13B, the hinge case 7 is provided with an attaching portion 7b on which an attaching cylindrical portion 7a running across its middle portion is provided. A cam plate member 36 is fixed to the hinge case 7 via the attaching cylindrical portion 7a provided on the attaching portion 7b. A synchronous rotation portion 14, a first friction torque generating portion 30a, a first drawing portion 35a, a first urging portion 21a, all shown in FIG. 4, are housed in a lower housing portion 7c of the hinge case 7. The synchronous rotation portion 14, a second friction torque generating portion 30b, a second drawing portion 35b, a second urging portion 21b, all shown in FIG. 4, are housed in an upper housing portion 7d of the hinge case 7.

As shown in FIG. 1B, a hinge case 8 of another biaxial hinge 6 has a structure identical to a hinge case 7. Attaching concave portions 2b, 2b for housing parallel biaxial hinges 4, 6 are provided on a first casing 2 coupled to a second casing 3 using the parallel biaxial hinges 4, 6, and attaching concave portions 3b, 3b for housing parallel biaxial hinges 4, 6 on the second casing. When the first casing 2 and the second casing 3 of a notebook PC 1 are closed relative to each other, one portion of the hinge case 7 is housed into one of the attaching concave portions 2b, 2b provided on the first casing 2 and the other portion into one of the attaching concave portions 3b, 3b provided on the second casing 3.

If hinge cases 7, 8 are provided, a synchronous rotation portion 14, a friction torque generating portion 30 and a drawing portion 35 are not exposed to the outside in attaching parallel biaxial hinges 4, 6 to a notebook PC 1, so that the parallel biaxial hinges 4, 6 have a neat appearance.

(Actuating Mechanism)

Figure 14:
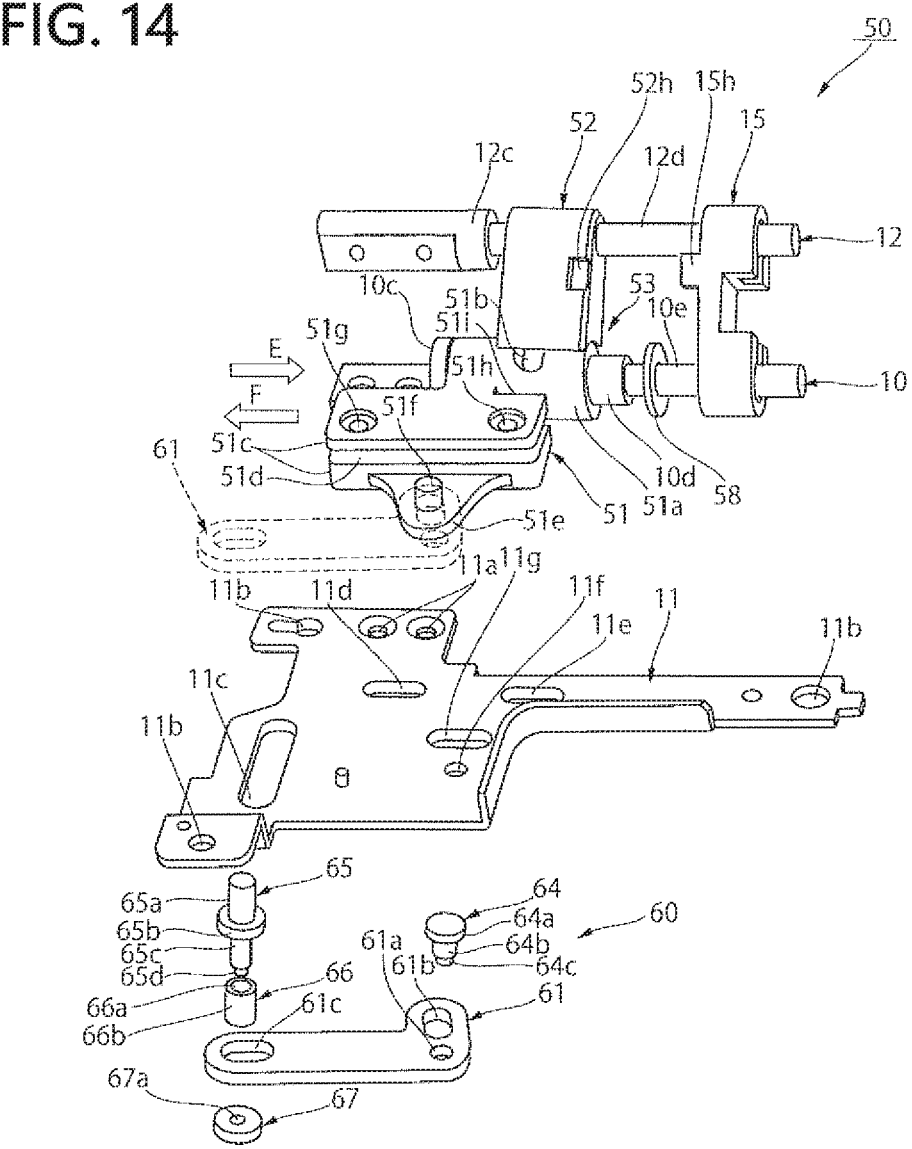
FIG. 14 shows an explanatory view of a structure of an actuating mechanism.

FIG. 14 shows an explanatory view of a structure of an actuating mechanism. As shown in FIG. 3, a parallel biaxial hinge 4 comprises a hinge portion 4a for rotating a first hinge shaft 10 attached to a first casing 2 and a second hinge shaft 12 attached to a second casing 3 relative to each other via a synchronous rotation portion 14 and an axial direction drive portion 53 being an example of passive operating portion for retrieving a predetermined operating output as accompanied by a rotating movement of the hinge portion 4a. Then, the axial direction drive portion 53 comprises a first attaching plate 11 provided so as to integrally rotate with the first hinge shaft 10, a follower member 52 rotating relative to the second hinge shaft 12 as accompanied by a rotating movement of the hinge portion 4a, and a cam member 51 having an engaged portion on an outer circumferential surface engaged with the follower member 52 and provided by outer-fitting onto the first hinge shaft 10 so as to be movable relative to the first attaching plate 11. The cam member 51 moves in a rotation axis line direction of the first hinge shaft 10 with the engaged portion being guided by the follower member 52, as accompanied by the rotating movement of the hinge portion 4a. Reference is made to the engaged portion below.

A parallel biaxial hinge 4 comprises an actuating mechanism 50 for elevating and lowering a key board portion 2a by driving a sinking mechanism 40 shown in FIGS. 2A to 2E. The actuating mechanism 50 amplifies a movement of the first hinge shaft 10 in a rotation axis line direction, as retrieved by the axial direction drive portion 53 being an example of passive operating portion, by an amplifying mechanism 60 being an example of amplifying mechanism, in order to output the movement as a linear movement of an output member 65 along a long hole 11c on a first attaching plate 11.

As shown in FIG. 14, in an axial direction drive portion 53, a follower member 52 rotates relative to a cam member 51, as the cam member 51 is engaged with the follower member 52, so that the cam member 51 being an example of outer-fitted movable member, as guided by a cam groove 51b being an example of engaged portion, moves in a rotation axis line direction of a first hinge shaft 10.

An amplifying mechanism 60 linearly moves an output member 65 held at a long hole 61c at one end of a lever member 61, along a long hole 11c, by inputting a movement from the cam member 51 in a rotation axis line direction of the first hinge shaft 10 into a long hole 61b at the other end.

A follower member 52 being an example of engaging member is provided on a rotation controlling portion 5. The follower member 52 is disposed with a second hinge shaft 12 being inserted through its bearing hole 52a, but sandwiched between a flange portion 12c and a gear supporting member 15, so that its movement in a rotation axis line direction is regulated.

A follower member 52 and a gear supporting member 15 are assembled by respectively engaging a pair of engaging concave spots 52h with a pair of engaging convex portions 15h, so that both forming an integral part rotates around a circular shaft portion 12d. As shown in FIG. 4, a screw portion 19a of a hexagon socket head cap screw 19 is passed through a through hole 52i of the follower member 52, and screwed with a female screw 15i of the gear supporting member 15.

As shown in FIG. 14 in reference to FIG. 3, a cam member 51 is urged by an elastic member 54 in a direction of arrow E. The cam member 51 is disposed with a first hinge shaft 10 being inserted therein, so as to be rotatable around a first circular shaft portion 10d, and movable along the first circular shaft portion 10d in a rotation axis line direction between a flange portion 10c and a lubricating member 58. The lubricating member 58 is rotatable around a second circular shaft portion 10e of the first hinge shaft 10, and sandwiched between an end surface of the first circular shaft portion 10d and a gear supporting member 15 to reduce a friction between the first circular shaft portion 10d and the gear supporting member 15.

A cam member 51 is provided with a pair of guide plates 51c on one end portion on an arrow F side of a ring-shaped circular cylindrical portion 51a. A gap 51i is provided between the guide plates 51c and the circular cylindrical portion 51a in an area on an arrow E side of the guide plates 51c, in order to avoid an interference with a hinge case 7 shown in FIG. 7. The hinge case 7 is integrated with a rotation control portion 5, while penetrating into the gap 51i and holding a follower member 52 and a circular cylindrical portion 51a of the cam member 51 from the outside.

A guide gap 51d is formed between a pair of the guide plates 51c. The guide gap 51d encloses a first attaching plate 11 where attaching holes 51g, 51h and long holes 11d, 11e overlap each other. The guide gap 51d holds the first attaching plate 11, such that the latter is movable in directions of arrows E, F within a range of the length of the long holes 11d, 11e.

As shown in FIG. 4, a first attaching plate 11 and a cam member 51 are assembled using slide pins 56, 57. A slide pin 57 is passed through an attaching hole 51g and a long hole 11d of the first attaching plate 11, and its screw portion 57a is screwed with a female screw on a cam member 51 side. A slide pin 56 is passed through an attaching hole 51h and a long hole 11e of the first attaching plate 11, and its screw portion 56a is screwed with a female screw on a cam member 51 side.

As shown in FIG. 3, an elastic member 54 is a tension coil spring for urging a cam member 51 in a direction of arrow E. The cam member 51 moves in a direction of arrow E as urged by an urging force of the elastic member 54, and moves in a direction of arrow F against the urging force of the elastic member 54. As shown in FIG. 4, one end 54b of the elastic member 54 is engaged with an engaging member 55 screwed with a female screw 11i of the first attaching plate 11, so that it is fixed to the first attaching plate 11. On the other hand, the other end 54a of the elastic member 54 is engaged with a slide pin 56 to move integrally with the cam member 51.

(Axial Direction Drive Portion)

Figure 15:
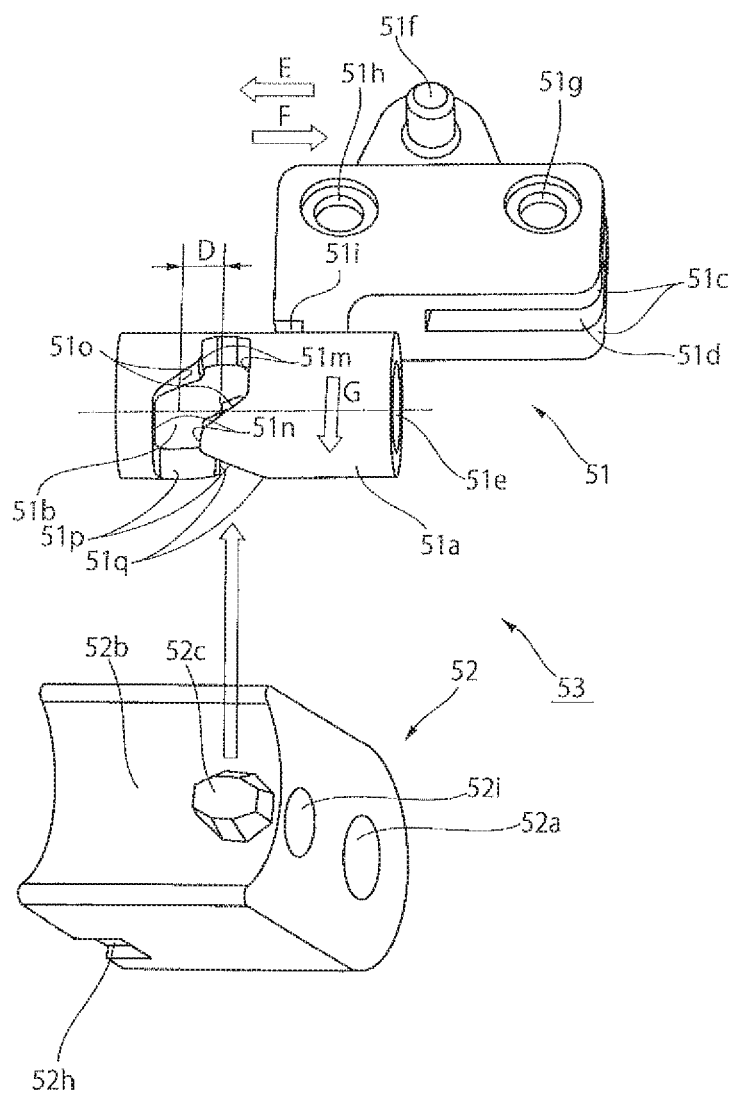
FIG. 15 shows an explanatory view of a structure of an axial direction drive portion.

FIG. 15 shows an explanatory view of a structure of an axial direction drive portion. As shown in FIG. 15, a cam groove 51b is formed on a cam member 51, by passing through the thickness of a cylindrical portion 51a. On the cam groove 51b, both circumferential end portions form flat portions 51m, 51q circulating at the same position in a rotation axis line direction, intermediate portions between the flat portions 51m, 51q form flat portions 51n circulating at a position shifted in a direction of arrow E. Furthermore, an inclined portion 51o for smoothly connecting each of the flat portions 51m and a corresponding flat portion 51n is formed between each of the flat portions 51m and a corresponding flat portion 51n, and an inclined portion 51p for smoothly connecting each of the flat portions 51n and a corresponding flat portion 51q between each of the flat portions 51n and a corresponding flat portion 51q.

On the other hand, an inner circumferential surface 52b for rotatably holding a cam member 51 in contact with a circumferential surface of a cylindrical portion 51a of a cam member 51 is formed on a follower member 52. An engaging projection 52c engaging a cam groove 52b is formed on an end portion of the inner circumferential surface 52b in a rotation axis line direction.

In an axial direction drive portion 53, an engaging projection 52c goes into the cam groove 51b, and a cylindrical portion 51a abuts against an inner circumferential surface 52b. When a follower member 52 rotates relative to a cam member 51, the inner circumferential surface 52b rubs the circular cylindrical portion 51a, and the engaging projection 52c moves along the cam groove 51b.

In the process in which a second casing 3 as shown in FIGS. 2A to 2E is rotated from 0 degree to 360 degrees relative to a first casing 2 an engaging projection 52c of a follower member 52 moves inside a cam groove 51b in a direction of arrow G. In the process in which the engaging projection 52c moves along a flat portion 51m, the cam member 51 is held at a certain position in a rotation axis line direction. When the engaging projection 52c passes by the flat portion 51m to move toward an inclined portion 51o, the cam member 51 moves in a direction of arrow F. When the engaging projection 52c passes by the inclined portion 51o to move toward a flat portion 51n, the cam member 51 is held at a certain position in a rotation axis line direction. When the engaging projection 52c passes by the flat portion 51n to move toward an inclined portion 51p, the cam member 51 moves in a direction of arrow E. When the engaging projection 52c passes by the inclined portion 51p to move toward the flat portion 51m, the cam member 51 is held at a certain position in a rotation axis line direction.

The cam groove 51b is designed such that a cam member 51 moves toward respective positions in Table 1, depending on an opening angle of a first casing 2 and a second casing 3, that is, that of a first hinge shaft 10 and a second hinge shaft 12. In Table 1, a cam member position represents a stroke (in mm) of the cam member 51 from 0 being its position when it moves in a direction of arrow E to a moving position in a direction of arrow F. Furthermore, an output member position represents a stroke (in mm) of an output member 65 as amplified by an amplifying mechanism 60 shown in FIG. 3 to a moving position in a direction of arrow A.

TABLE 1

| Opening angle | Cam member position | Output member position |
|---|---|---|
| 0 | 0 | 0 |
| 20 | 1.77 | 7.08 |
| 73 | 2 | 8 |

TABLE 1-continued

| Opening angle | Cam member position | Output member position |
|---|---|---|
| 80 | 2 | 8 |
| 193 | 2 | 8 |
| 200 | 2 | 8 |
| 207 | 1.77 | 7.08 |
| 254 | 0 | 0 |
| 263 | 0 | 0 |
| 270 | 0 | 0 |
| 277 | 0 | 0 |
| 360 | 0 | 0 |

As shown in Table 1, in a range of an opening angle from 20 to 207 degrees, a cam member 51 moves in a direction of arrow A, and a keyboard holding plate 46 and a keyboard portion 2a shown in FIGS. 2A to 2E are pushed up. Furthermore, in a range of an opening angle from 0 to 20 as well as from 207 to 360 degrees, the cam member 51 moves in a direction of arrow E, and the keyboard holding plate 46 and the keyboard portion 2a shown in FIGS. 2A to 2E are retracted downward.

(Amplifying Mechanism)

Figure 16A:
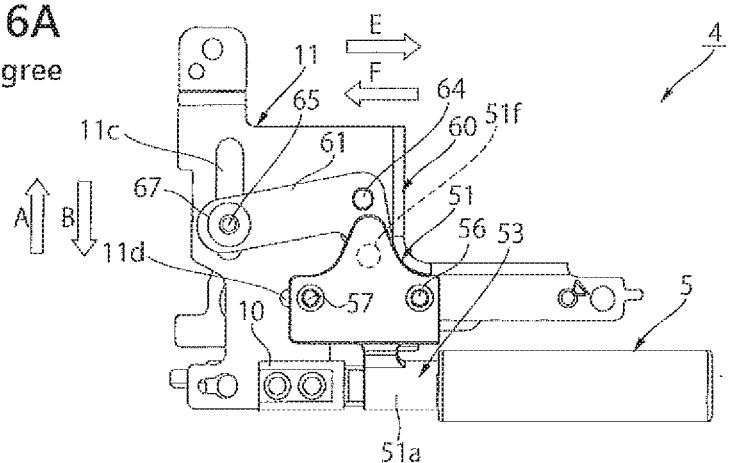
FIGS. 16A to 16C show explanatory views of an operation of an amplifying mechanism; where
Figure 16B:
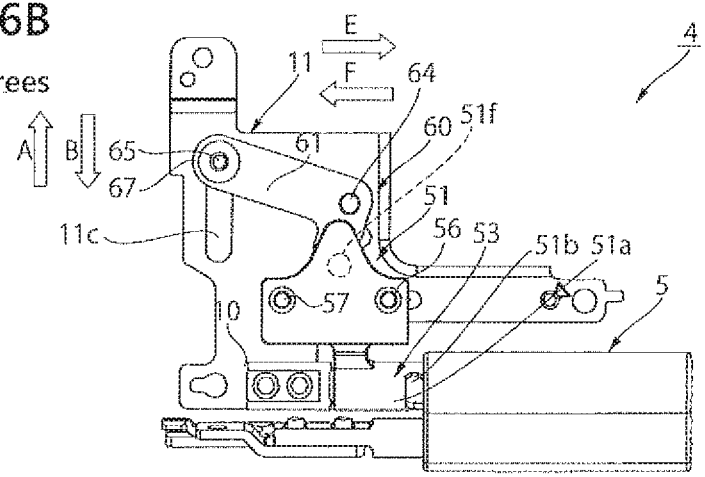
Figure 16C:
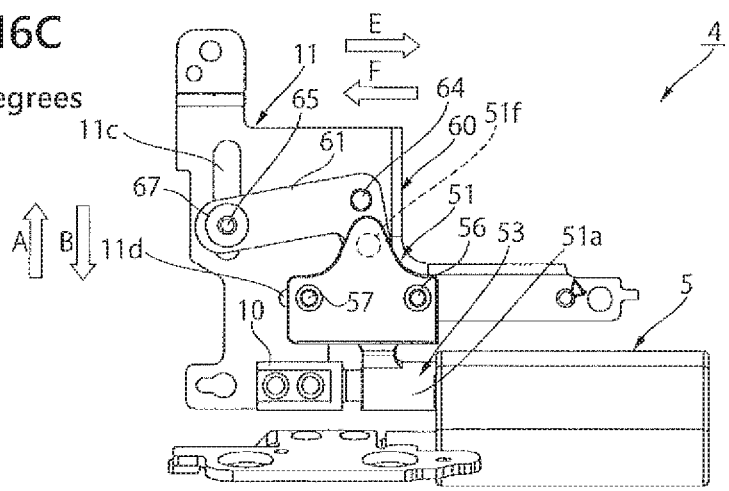
Figure 17A:
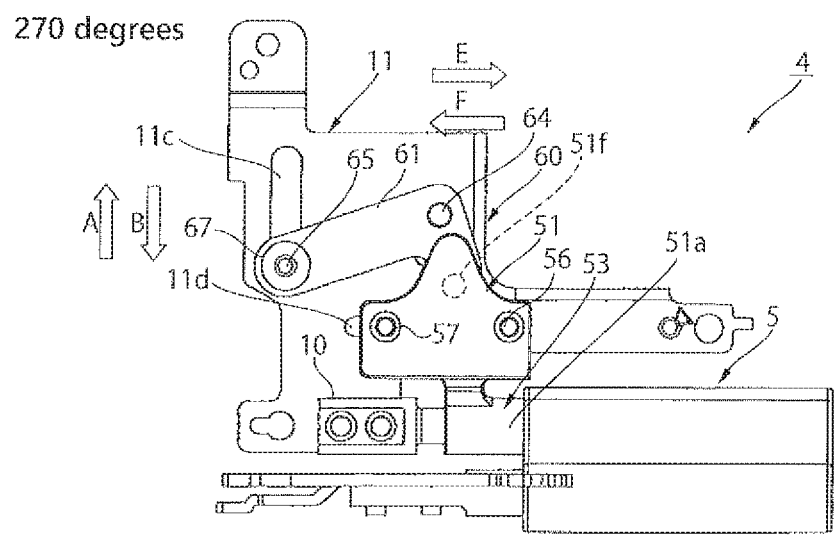
FIGS. 17A and 17B show explanatory views of an operation of an amplifying mechanism; where
Figure 17B:
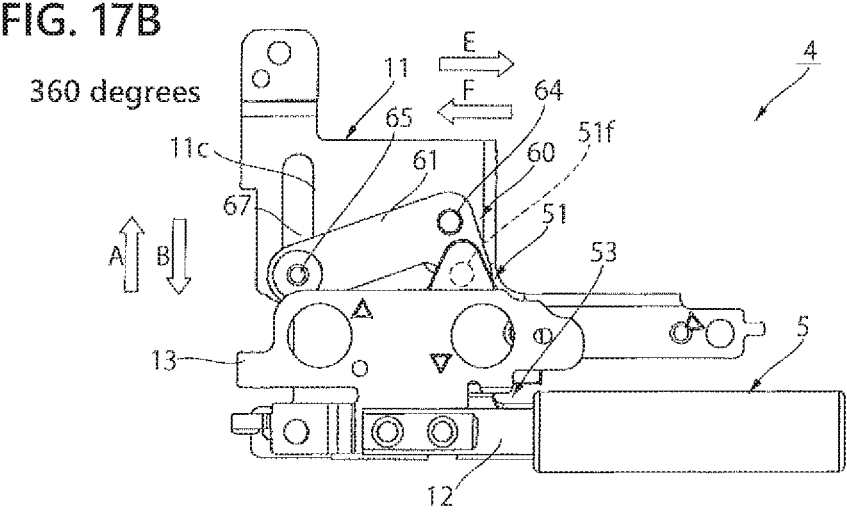

FIGS. 16A to 16C show explanatory views of an operation of an amplifying mechanism. FIGS. 17A and 17B show explanatory views of an operation of an amplifying mechanism. In FIGS. 16A to 16C, FIG. 16A shows 0 degree, FIG. 16B—80 degrees, and FIG. 16C—254 degrees. In FIGS. 17A and 17B, FIG. 17A shows 270 degree, and FIG. 17B—360 degrees.

As shown in FIG. 14, an amplifying mechanism 60 amplifies by a lever member 61 a movement amount of a first hinge shaft 10 in a rotation axis line direction, as is output to an output member 51f of a cam member 51, in order to output it as a movement of an output member 65 along a long hole 11c.

As shown in FIG. 3, a lever member 61 is disposed between a supporting portion 51e of a cam member 51 and a first attaching plate 11. The lever member 61 is disposed so as to cover from below a lower surface of the first attaching plate 11, and pivotally supported by a rotating shaft member 64 to be rotatable relative to the first attaching plate 11. The output member 51f of a cam member 51 is engaged with one end of the lever member 61, and the output member 65 freely movable along the long hole 11c is engaged with the other end of the lever member 61.

As shown in FIG. 14, a lever member 61 is rotatable around a rotating shaft member 64. The rotating shaft member 64 is assembled by passing through a shaft hole 11f of a first attaching plate 11 and screwing a screw portion 64c on its tip with a female screw 61a of the lever member 61.

A length ratio of a long arm to a short arm of a lever member 61 is an amplification factor. As shown in Table 1, the amplification factor is 4, and a movement amount of a cam member 51 is amplified 4 times to be output to the output member 65. A long hole 61b is formed on an end portion of the short arm of the lever member 61 in a direction substantially perpendicular to arrows E, F. An output member 51f fixed to the cam member 51 is inserted into the long hole 61b of the lever member 61. The output member 51f moves relative to the first attaching plate 11 fixed to a first attaching plate 11 along a long hole 11g of the first attaching plate 11. At this time, the output member 51f of the cam member 51 moves in a direction of crossing a long hole 61b of the lever member 61, moves the long hole 61b in the direction of arrows E, F, and rotates the lever member 61 around the rotating shaft member 64.

A long hole 61c is formed on an end portion of a long arm of a lever member 61 in a direction substantially along arrows E, F. An output member 65, with a circular cylindrical member 66 being outer-fitted thereon, passes through a long hole 11c of a first attaching plate 11 and a long hole 61b of the lever member 61, and then is screwed into a female screw 67a of a locking female screw 67 provided on a screw portion 61d on its tip. The output member 65 is located at an intersection of the long hole 11c of the first attaching plate 11 and the long hole 61b of the lever member 61, and as accompanied by a rotation of the lever member 61, moves in a direction along the long hole 11c of the first attaching plate 11, in an amplitude amplified 4 times as much as an amplitude of the output member 51f.

As shown in FIG. 2A, when a first casing 2 is opened 0 degree, 80 degrees, 254 degrees, 270 degrees and 360 degrees relative to a second casing 3, opening angles of a parallel biaxial hinge 4 (6) are as well expressed to be respectively 0 degree, 80 degrees, 254 degrees, 270 degrees and 360 degrees.

FIGS. 16A-16C and FIGS. 17A-17B show views of a parallel biaxial hinge 4 opened 0 degree, 80 degrees, 254 degrees, 270 degrees and 360 degrees, from below, that is the lever member 61 side.

As shown in FIG. 16A, in a parallel biaxial hinge 4 opened 0 degree, a cam member 51 moves in a direction of arrow E, and an output member 65 moves in a direction of arrow B. In this manner, as shown in FIG. 2A, an inclined surface 45a of a cam member 45 of a slide member 44 does not abut against a keyboard holding plate 46, and the keyboard holding plate 46 and a keyboard portion 2a maintains a lowered position.

As shown in Table 1, in a process of transition of an opening angle from 0 to 20 degrees, a cam member 51 moves in a direction of arrow F, and an inclined surface 45a of a cam member 45 of a slide member 44 pushes up a keyboard holding plate 46 against an urging of an elastic member 47.

As shown in FIG. 16B, in a parallel biaxial hinge 4 opened 80 degrees, a cam member 51 moves in a direction of arrow F, and an output member 65 moves in a direction of arrow A.

As shown in Table 1, in a process of transition of an opening angle from 207 to 254 degrees, a cam member 51 moves in a direction of arrow F, and an inclined surface 45a of a cam member 45 of a slide member 44 releases a keyboard holding plate 46 from being pushed up. In this manner, an elastic member 47 pushes down the keyboard holding plate 46 so as to retract the keyboard holding plate 46 from a surface of a first casing.

As shown in FIG. 16C, in a parallel biaxial hinge 4 opened 254 degree, a cam member 51 moves in a direction of arrow E, and an output member 65 moves in a direction of arrow B. As shown in FIG. 17A, in a parallel biaxial hinge 4 opened 270 degree, the cam member 51 moves in a direction of arrow E, and the output member 65 moves in a direction of arrow B. As shown in FIG. 17B, in a parallel biaxial hinge 4 opened 360 degree, the cam member 51 moves in a direction of arrow E, and the output member 65 moves in a direction of arrow B.

Effect of Embodiment 1

In Embodiment 1, the cam member 51 is provided by outer-fitting onto a first hinge shaft 10, and comprises the cam groove 51b on its outer circumferential surface. In this manner, there is no gap in the circumferential direction of the cam member 51, so that even a thin-walled cam member 51 can be highly rigid and strong to resist its engagement with the follower member 52.

In Embodiment 1, the cam member 51 is provided by outer-fitting onto the first hinge shaft 10, and slides relative to the first attaching plate 11 in a rotation axis line direction of the first hinge shaft 10. In this manner, it is possible to gain a movement of the first hinge shaft 10 in the rotation axis line direction, within a small space very close to the first hinge shaft 10. Therefore, the parallel biaxial hinges 4, 6 can be downsized. Then, using the cam member 51 relatively downsized, it is possible to retrieve a linear movement of a relatively large amplitude and a relatively important force, as accompanied by a rotation of the first hinge shaft 10 and the second hinge shaft 12.

In Embodiment 1, the cam member 51 moves in a rotation axis line direction of the first hinge shaft 10 with the cam groove 51b being guided by the follower member 52, as accompanied by the rotating movement of the hinge portion 4a. In this manner, it is possible to retrieve various movements from the cam member 51 by differentiating relationship between an opening angle in Table 1 and a cam member position in the cam groove 51b, depending on its use.

In Embodiment 1, the follower member 52 comprises the engaging projection 52c engaged with the cam groove 51b. In this manner, processing and assembly of parts are simplified, as compared to an inverse engagement relationship, that is, the case for a cam groove being formed on an engaging member and an engaging projection being provided on an outer-fitted movable member.

In Embodiment 1, the amplifying mechanism 60 is provided on a first attaching plate 11, so that the amplifying mechanism 60 can be compactly housed. Still further, the amplifying mechanism 60 outputs a movement amount of the cam member 51 in a rotation axis line direction as amplified, so that a movement of parts at any stroke can be realized using a limited movement amount of the cam member.

In Embodiment 1, the hinge case 7 holds in its interior the rotation controlling portion 5 including the synchronous rotation portion 14, the follower member 52 and the cylindrical portion 51a of the cam member 51 to integrally cover all of them. In this manner, the hinge case 7 can absorb from outward a part of load accompanied by an engagement of the follower member 52 and the cam member 51 to mitigate an impact on parallelism of the first hinge shaft 10 and the second hinge shaft 12.

In Embodiment 1, one end side of the follower member 52 is engaged with the cam groove 51b, and its other end side is outer-fitted onto the second hinge shaft 12. In this manner, the second hinge shaft 12 can absorb from outward load accompanied by an engagement of the follower member 52 and the cam member 51 to eliminate an impact on parallelism of the first hinge shaft 10 and the second hinge shaft 12.

In Embodiment 1, the follower member 52 is fixedly provided on the member for pivotally supporting the first hinge shaft 10 and the second hinge shaft 12. In this manner, the member for pivotally supporting hinge shafts can absorb load accompanied by an engagement of the follower member 52 and the cam member 51 to eliminate an impact on parallelism of the first hinge shaft 10 and the second hinge shaft 12.

In Embodiment 1, when the first casing 2 and the second casing 3 are opened and closed relative to each other, the sinking mechanism 40 for the key board portion 2a provided on the first casing 2 functions from a predetermined opening and closing angle to retract the key board portion 2a toward the interior of the first casing 2. In this manner, when the first casing 2 and the second casing 3 are opened 360 degrees relative to each other, the key board portion 2a is not an obstacle. On the other hand, at an opening angle for key operation on the key board portion 2a, the key board portion 2a protrudes outward of the first casing 2 so as to enhance operability of inputting operations via the key board portion 2a.

In Embodiment 1, when the first casing 2 and the second casing 3 are opened and closed 360 degrees relative to each other, the friction torque generating portion 30 can stop and hold the first casing 2 and the second casing 3 at any opening and closing angle. Furthermore, the drawing portion 35 realizes an automatic opening and closing to predetermined angles of 0 and 360 degrees, so that a latch mechanism for maintaining an opening angle at 0 and 360 degrees can be omitted.

Embodiment 2

As shown in FIG. 2A, in Embodiment 1, a cam member 51 shown in FIG. 3 moves in a direction of arrow F, and an elastic member 54 is expanded in a process in which a cam member 45 elevates a keyboard holding plate 46 against an urging of an elastic member 47. On the contrary, the cam member 51 shown in FIG. 3 moves in a direction of arrow E, and is assisted by the elastic member 54 in a process in which the keyboard holding plate 46 is lowered as urged by in association with release of the keyboard holding plate 46 from pressure upward. In this manner, there is a significant difference in loads of the cam member 45 while elevating the keyboard holding plate 46 and lowering it.

Therefore, in Embodiment 2, an elastic member 54 is replaced by a compression coil spring, and this elastic member 54 is structured to urge a cam member 51 in a direction of arrow F.

In Embodiment 2, a cam member 51 shown in FIG. 3 moves in a direction of arrow F, as assisted by an elastic member 47, in a process in which a cam member 45 elevates a keyboard holding plate 46 against an urging of an elastic member 47. On the contrary, the cam member 51 shown in FIG. 3 moves in a direction of arrow E against an urging of the elastic member 54 in a process in which the keyboard holding plate 46 is lowered as urged by the elastic member 47 in association with release of the keyboard holding plate 46 from pressure upward. In this manner, a load from the cam member 51 to a follower member 52 as accompanied by elevating and lowering the keyboard holding plate 46 is leveled.

Further Embodiments

A parallel biaxial hinge according to the invention is not limited to specific structure and applications as described in Embodiments 1, 2. It can be also realized in other embodiments, in which a part or the whole of structure in Embodiments 1, 2 is replaced by an equivalent structure. In Embodiments 1, 2, reference is made to the embodiments of a parallel biaxial hinge used in a notebook PC. However, a biaxial hinge 4 according to Embodiments 1, 2 can be also implemented in electronic devices other than a notebook PC. It can be used in various devices and containers, wherein a first casing and a second casing are openably and closably coupled to each other by parallel biaxial hinges.

In Embodiments 1, 2, reference is made to a sinking mechanism 40 for elevating and lowering a keyboard portion 2a relative to a first casing 2. However, a linear movement retrieved from a parallel biaxial hinge as accompanied by an opening and closing operation of a first casing and a second casing of any kind is also applicable to an operation of moving a member other than the keyboard portion 2a, such as opening and closing a lid of a communication connector and a protection member of a camera lens, as well as removing and inserting a locking pin.

In Embodiments 1, 2, a cam groove 51b is formed on an outer-fitted movable member outer-fitted onto a first hinge shaft 10, and an engaging projection 52c is provided on an engaging member fixed to a gear supporting member 15. However, an engaging projection can be provided on an outer-fitted movable member outer-fitted onto a first hinge shaft 10, and a cam groove can be formed on an engaging member fixed to a gear supporting member 15, so that the engaging member is engaged with an engaging projection.

In Embodiments 1, 2, a single cam groove is formed on an outer-fitted movable member outer-fitted onto a first hinge shaft 10. However, a plurality of cam grooves are formed on an outer-fitted movable member, a plurality of engaging projections can be formed on an engaging member rubbing and opposing the outer-fitted movable member, wherein each of the engaging projections is engaged with the corresponding one of the cam grooves.

In Embodiment 1, a single outer-fitted movable member is provided, wherein it is outer-fitted onto a first hinge shaft 10 and engaged with a follower member 52. However, a plurality of engaging projections can be provided, one spaced apart from the other in a rotation axis line direction of the follower member 52, wherein each of the engaging projections is engaged with a cam groove on each of a plurality of cam members. Cam grooves differently shaped depending on a plurality of uses of operating outputs can be formed on respective cam members so as to retrieve a plurality of operating outputs from a plurality of cam members.

In Embodiments 1, 2, a cam groove 51b is designed such that a cam member 51 reciprocates once in a rotation axis line direction as accompanied by a rotation by 360 degrees of a first hinge shaft 10 and a second hinge shaft 12. In Embodiments 1, 2, a cam groove 51b can be also designed such that a cam member 51 moves one-way once in a rotation axis line direction as accompanied by a rotation of the first hinge shaft 10 and the second hinge shaft 12 over 360 degrees. A cam member can be also designed to slowly move in sections with large load.

In Embodiments 1, 2, a first gear 17 fixed to a first hinge shaft 10 is structured to gear a second gear 18 fixed to a second hinge shaft 12 via an intermediate gear 20; however, the first gear 17 and the second gear 18 are respectively replaced by spur gears which are meshed with each other without an intermediate gear 20. A mechanism for rotating the first hinge shaft 10 and the second hinge shaft 12 in a synchronous manner can be also realized by a gear mechanism other than the above-mentioned, such as toothed belt mechanism.

In Embodiments 1, 2, reference is made to an urging portion 21 consisting of a plurality of ring-shaped steel plates or spring washers, one being placed above the other. However, as compression mechanism for the urging portion 21, these can be replaced by a compression coil spring, an elastic synthetic resin member such as rubber.

Since the invention is constructed as described in the foregoing, it is suitably used as a biaxial hinge for opening and closing a first casing and a second casing in a synchronous manner, so as to realize an opening and closing in a range of 360 degrees, in an electronic device such as a notebook PC and others. In particular, it is suitably used in a tablet-type notebook PC having a touch function among notebook PCs.

What is claimed is:

1. A parallel biaxial hinge comprising:
a hinge portion for coupling a first hinge shaft attached to a first casing via a first attaching plate and a second hinge shaft attached to a second casing via a synchronous rotation portion, both the hinge shafts being thereby rotatable in parallel to each other, the hinge portion being configured to transmit a rotation of one of said first hinge shaft and said second hinge shaft to the other hinge shaft, wherein the synchronous rotation portion rotates the first hinge shaft and the second hinge shaft in a synchronized manner; and
a passive operating portion for retrieving a predetermined driving force as accompanied by a movement of the hinge portion;
said passive operating portion comprising:
a follower member for rotatably inserting said second hinge shaft therein, said follower member being unrotatable;
a cam member comprising a cylindrical portion, said first hinge shaft being rotatably inserted thereto, said cam member being provided to engage with said first attaching plate, said cam member being thereby slidable relative to said first attaching plate, and constructed by fitting an engaging projection of said follower member into a cam groove provided on an outer circumference of said cylindrical portion;
a tension coil spring provided between said cam member and said first attaching plate; and
a lever member having one end portion coupled to said cam member and the other end portion rotatably attached to said first attaching plate, an output member being attached to the other end portion;
said parallel biaxial hinge being thereby constructed to use said output member to retrieve said driving force by a rotating movement of said lever member as accompanied by a movement of said hinge portion.

2. The parallel biaxial hinge according to claim 1, said follower member comprising an inner circumferential surface in a slidable contact with the outer circumference of said cylindrical portion of said cam member, said follower member being fixed to a gear supporting member rotatably supporting the first hinge shaft and the second hinge shaft.

3. The parallel biaxial hinge according to claim 1, said output member being rotatably coupled to said lever member and inserted into a long hole provided on said first attaching plate, in order to convert said rotating movement of said lever member into a linear movement of said output member.

4. The parallel biaxial hinge according to claim 3, said output member operating a sinking mechanism for a keyboard portion provided on the first casing.

5. The parallel biaxial hinge according to claim 3, said rotation controlling portion being composed of a first rotation controlling portion and a second rotation controlling portion;
said first rotation controlling portion composed of a first friction torque generating portion, a first urging portion and a first drawing portion; and
said second rotation controlling portion composed of a second friction torque generating portion, second urging potion and a second drawing portion.

6. The parallel biaxial hinge according to claim 1, each of said first hinge shaft and said second hinge shaft being respectively provided with a rotation controlling portion for controlling a rotation thereof.

7. An electronic device comprising the parallel biaxial hinge according claim 1.

* * * * *